(12) United States Patent
Justice et al.

(10) Patent No.: US 12,059,073 B1
(45) Date of Patent: Aug. 13, 2024

(54) APPARATUS FOR STOWING ITEMS

(71) Applicant: AMAZON TECHNOLOGIES, INC., Seattle, WA (US)

(72) Inventors: Gregory Kim Justice, Bremerton, WA (US); Venkata Srikiran Bodapati, Snoqualmie, WA (US); Rafiuddin Arif Ahud, Mill Creek, WA (US); Ryan Q. Long, Lynnwood, WA (US); Michael Morgan, Seattle, WA (US); Justin William Andersen, Puyallup, WA (US); Vahideh Kamranzadeh, Seattle, WA (US); Nirmal Doshi, Bothell, WA (US); Nathan Pius O'Neill, Snohomish, WA (US); Forrest Alexander Bourke, Seattle, WA (US); Rachel M. Burroughs, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 543 days.

(21) Appl. No.: 17/210,127

(22) Filed: Mar. 23, 2021

(51) Int. Cl.
| | |
|---|---|
| *A47B 96/14* | (2006.01) |
| *A47B 57/06* | (2006.01) |
| *A47F 5/08* | (2006.01) |
| *G01G 19/52* | (2006.01) |

(Continued)

(52) U.S. Cl.
CPC .......... *A47B 96/1441* (2013.01); *A47B 57/06* (2013.01); *A47F 5/0815* (2013.01); *G01G 19/52* (2013.01); *A47B 57/16* (2013.01); *A47B 57/40* (2013.01); *A47B 96/1408* (2013.01); *A47F 5/0838* (2013.01)

(58) Field of Classification Search
CPC .... A47F 5/0815; A47F 5/0823; A47F 5/0869; A47F 5/0876; A47F 5/08; A47F 5/0006; A47F 5/0838; A47B 96/1441; A47B 57/06; A47B 57/08; A47B 57/10; A47B 57/16; A47B 57/30; A47B 57/40; A47B 57/406; A47B 57/42; A47B 96/1408; G01G 19/52
See application file for complete search history.

(56) References Cited

U.S. PATENT DOCUMENTS

| | | | |
|---|---|---|---|
| 3,286,850 A | * 11/1966 | Ruhnke | A47B 61/003 256/65.16 |
| 4,027,799 A | * 6/1977 | Stucker | A47F 7/12 248/220.42 |

(Continued)

*Primary Examiner* — Devin K Barnett
(74) *Attorney, Agent, or Firm* — Lindauer Law, PLLC

(57) ABSTRACT

An apparatus includes a crossbar to which a plurality of accessories using different mechanical interfaces may be attached and detached. The crossbar is instrumented and provides information, such as a weight change due to addition to, or removal of, items from an accessory on the crossbar. An extensible bracket attaches the crossbar to a supporting structure, decreasing mechanical strain on the crossbar due to minor misalignment of the supporting structure. Accessories such as wire hooks, shelves, bins, and so forth may be supported by the crossbar. A tether device, locking cam device, or clip device may be used to prevent lateral movement of components such as the accessories or the entire crossbar relative to its supporting structure. A baffle may be affixed to the crossbar to constrain airflow for operation in a temperature-controlled case.

18 Claims, 13 Drawing Sheets

(51) Int. Cl.
*A47B 57/16* (2006.01)
*A47B 57/40* (2006.01)

(56) References Cited

U.S. PATENT DOCUMENTS

| | | | | | |
|---|---|---|---|---|---|
| 4,316,547 | A * | 2/1982 | Varon | ............... | A47G 25/0692 211/124 |
| 4,344,540 | A * | 8/1982 | Marschak | ............ | A47F 5/0823 248/220.31 |
| 4,349,113 | A * | 9/1982 | Schreiner | ............. | A47F 5/0025 211/208 |
| 4,606,466 | A * | 8/1986 | Fredrickson | ......... | A47F 5/0869 40/490 |
| 4,771,897 | A * | 9/1988 | Ho | ........................ | A47G 29/10 211/94.01 |
| 4,828,122 | A * | 5/1989 | Day | ...................... | A47H 1/142 248/251 |
| 4,863,020 | A * | 9/1989 | Klemow | ............... | B65D 73/00 206/335 |
| 4,869,378 | A * | 9/1989 | Miller | .................... | F16M 13/00 248/225.11 |
| 5,429,252 | A * | 7/1995 | Liu | ......................... | A47K 1/08 211/94.01 |
| 5,439,120 | A * | 8/1995 | Brozak | ................ | A47F 5/0869 206/806 |
| 5,454,638 | A * | 10/1995 | Bird | ...................... | A47B 57/42 108/108 |
| 5,472,103 | A * | 12/1995 | Merl | .................... | A47B 47/022 211/187 |
| 5,509,541 | A * | 4/1996 | Merl | .................... | A47B 57/42 211/208 |
| 5,526,941 | A * | 6/1996 | Ford | .................... | A47F 5/0869 211/60.1 |
| 5,641,081 | A * | 6/1997 | Merl | ....................... | A47F 5/08 211/106 |
| 5,740,927 | A * | 4/1998 | Yemini | ................ | A47F 5/0853 211/94.01 |
| 5,769,247 | A * | 6/1998 | Merl | .................... | A47B 47/022 211/88.01 |
| 5,954,288 | A * | 9/1999 | Shih | ....................... | A45F 5/004 242/380 |
| 6,216,319 | B1 * | 4/2001 | Elkins | .................... | A45F 5/00 224/904 |
| 6,519,791 | B2 * | 2/2003 | Randolph | ............... | E03C 1/021 4/695 |
| 6,530,486 | B1 * | 3/2003 | Batting | ................ | A47F 5/0823 211/57.1 |
| 6,786,340 | B2 * | 9/2004 | Ford | .................... | A47F 5/0823 211/103 |
| 6,860,456 | B2 * | 3/2005 | Magnusson | ........... | A47B 47/027 248/303 |
| 6,967,284 | B1 * | 11/2005 | Gretz | .................... | H02G 3/125 174/57 |
| 7,014,052 | B2 * | 3/2006 | Dettorre | ................ | A47F 5/0838 211/94.01 |
| 7,086,544 | B2 * | 8/2006 | Doench | ................ | A47B 96/028 248/222.51 |
| 7,219,806 | B1 * | 5/2007 | Morrow | ................ | A47F 5/0869 211/59.1 |
| 7,438,268 | B2 * | 10/2008 | Kologe | ................. | A47F 5/0838 248/220.22 |
| 7,654,497 | B1 * | 2/2010 | Karan | ...................... | A47F 5/13 248/250 |
| 7,882,964 | B2 * | 2/2011 | Battaglia | ............... | A47F 5/0823 248/302 |
| 8,028,845 | B2 * | 10/2011 | Himes | .................. | A47B 47/021 211/103 |
| D648,522 | S * | 11/2011 | Gorman | ......................... | D3/215 |
| 8,146,785 | B2 * | 4/2012 | Pruitt | ..................... | B25B 23/00 224/661 |
| 8,177,176 | B2 * | 5/2012 | Nguyen | .................. | H02G 3/20 248/200.1 |
| 8,215,597 | B1 * | 7/2012 | Medlin, Sr. | .......... | H05K 5/0204 248/200.1 |
| 8,474,632 | B2 * | 7/2013 | Yang | ..................... | A47K 3/281 211/94.01 |
| 8,556,091 | B2 * | 10/2013 | Cutler | .................... | A47K 3/281 211/119.004 |
| 8,573,415 | B2 * | 11/2013 | Ernst | ........................ | B25H 3/04 248/220.21 |
| 8,789,712 | B2 * | 7/2014 | Johnson | ................ | A47F 5/0025 211/94.01 |
| 9,468,312 | B2 * | 10/2016 | Denby | ..................... | A47F 5/108 |
| 9,834,130 | B1 * | 12/2017 | Peters | ...................... | B60P 7/15 |
| D811,855 | S * | 3/2018 | Stultz | ............................. | D8/354 |
| 10,466,095 | B1 * | 11/2019 | O'Neill | ..................... | G01G 19/42 |
| 10,709,267 | B2 * | 7/2020 | Kologe | ...................... | A47B 57/42 |
| 10,710,492 | B2 * | 7/2020 | Eichstedt | .............. | B60P 1/6409 |
| 10,716,390 | B2 * | 7/2020 | Wagner | ..................... | A45F 5/00 |
| 11,125,607 | B1 * | 9/2021 | Justice | ..................... | G01G 19/42 |
| 11,503,926 | B2 * | 11/2022 | Zhai | ......................... | G01G 21/23 |
| 11,514,766 | B1 * | 11/2022 | McDaniel | .......... | G08B 13/2485 |
| 11,752,919 | B2 * | 9/2023 | Robinson, Jr. | ........ | B60P 7/0815 410/104 |
| 11,766,140 | B1 * | 9/2023 | Justice | .................. | A47F 5/0823 177/199 |
| 11,911,889 | B1 * | 2/2024 | Pascua | .................... | A45F 5/021 |
| 2005/0045573 | A1 * | 3/2005 | Winig | .................. | A47F 5/0815 211/90.02 |
| 2006/0113261 | A1 * | 6/2006 | Recknagel | ............ | A47F 5/0869 211/59.1 |
| 2008/0203040 | A1 * | 8/2008 | Kologe | ................. | A47F 5/0838 211/103 |
| 2011/0147323 | A1 * | 6/2011 | Sainato | ..................... | A47F 1/12 40/642.02 |
| 2012/0103031 | A1 * | 5/2012 | Grant | ..................... | E05B 67/36 70/14 |
| 2012/0298816 | A1 * | 11/2012 | Siddiqui | ................. | H02G 3/105 248/220.21 |
| 2016/0048798 | A1 * | 2/2016 | Meyer | ..................... | G01G 19/42 705/28 |
| 2016/0135616 | A1 * | 5/2016 | Fisher | .................... | A47F 5/0006 211/13.1 |
| 2018/0220812 | A1 * | 8/2018 | Shea | ..................... | A47F 5/0068 |
| 2019/0298085 | A1 * | 10/2019 | Johnson | ............... | F16M 13/022 |
| 2019/0380489 | A1 * | 12/2019 | Gordon | .................. | A47B 81/00 |
| 2020/0085212 | A1 * | 3/2020 | Kologe | .................. | A47B 57/42 |
| 2020/0187675 | A1 * | 6/2020 | Obitts | ................... | A47F 5/0018 |
| 2021/0030169 | A1 * | 2/2021 | Zhai | ......................... | G01G 19/52 |
| 2021/0330094 | A1 * | 10/2021 | Smedley | ................ | A47B 45/00 |
| 2023/0095417 | A1 * | 3/2023 | Nagel | ..................... | A47B 45/00 211/59.3 |

* cited by examiner

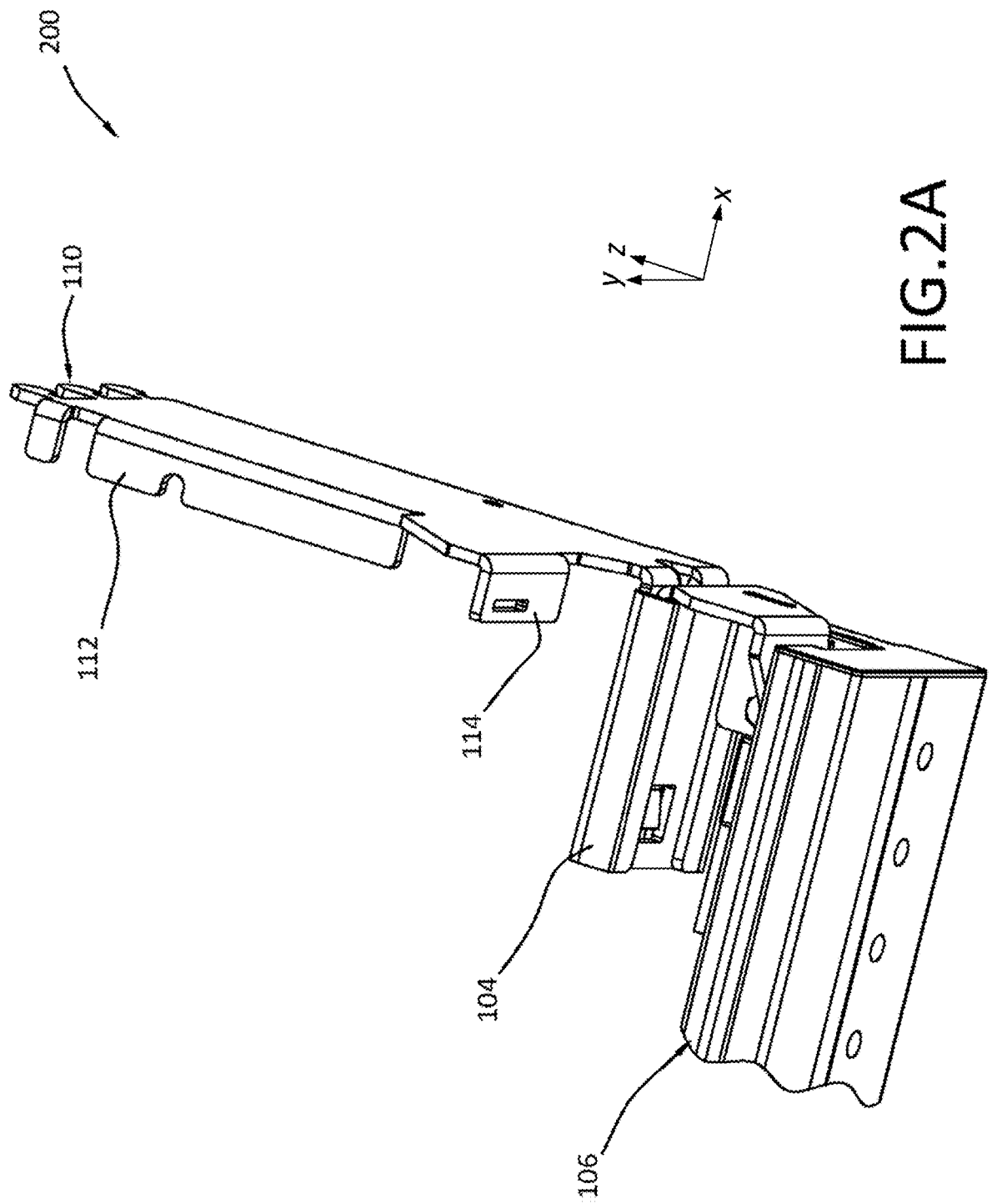

APPARATUS FOR STOWING ITEMS

BACKGROUND

Fixtures may be used to hold accessories. These accessories may in turn be used to stow items. For example, a store or warehouse may use various accessories such as hooks, shelves, and so forth to stow items.

BRIEF DESCRIPTION OF FIGURES

The detailed description is set forth with reference to the accompanying figures. The use of the same reference numbers in different figures indicates similar or identical items or features. The figures are not necessarily drawn to scale, and in some figures, the proportions or other aspects may be exaggerated to facilitate comprehension of particular aspects.

FIG. 2A illustrates a top view of an apparatus having an extensible bracket and a plurality of mechanical interfaces, according to some implementations.

Figure 1A:
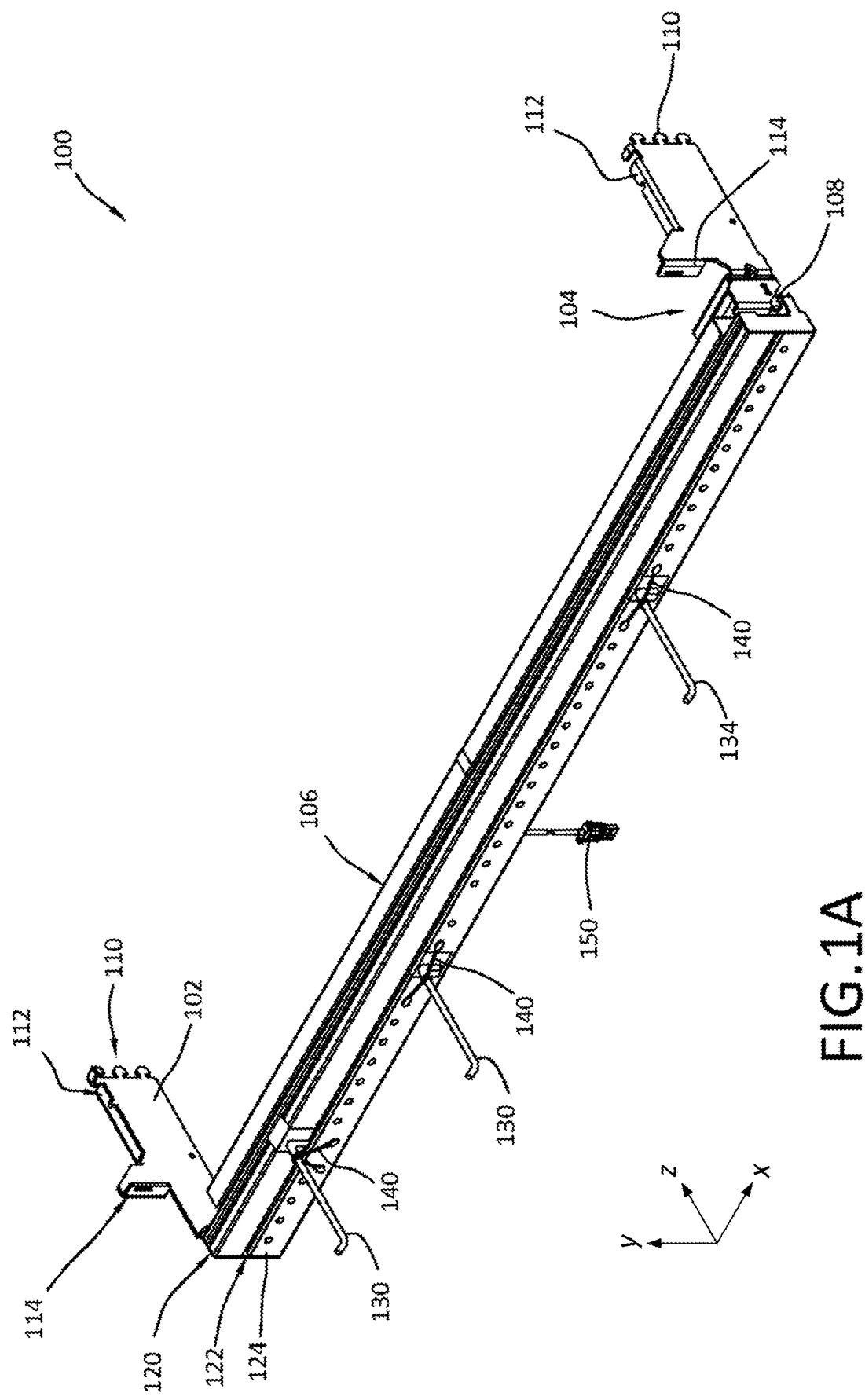
FIG. 1A illustrates a front view of an apparatus having an extensible bracket and a plurality of mechanical interfaces, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

A materials handling facility ("facility") or other setting may use fixtures that support accessories. An accessory is used to stow or hold items. Accessories may use different mechanical interfaces to attach to a fixture. For example, a fixture may be a slatwall having one or more horizontal slots, a pegboard having multiple holes, a saddle mount, and so forth. The fixture itself may in turn be supported by an external structure. For example, the fixture may be attached to gondola uprights, an existing slatwall, pegboard, and so forth.

Described in this disclosure is an apparatus to facilitate stowage of items. The apparatus may include a crossbar and at least one extensible bracket. The crossbar may be instrumented and provide information, such as a weight change due to addition to, or removal of, items from an accessory on the crossbar. The extensible bracket attaches the crossbar to a supporting structure and decreases mechanical strain on the crossbar that may otherwise occur due to minor misalignment of the supporting structure. Accessories such as wire hooks, shelves, bins, and so forth may be supported by the crossbar. Devices such as a locking cam device or clip device may be used to prevent lateral movement of components such as the accessories on the crossbar, or the entire crossbar itself relative to its supporting structure. A tether device may be used in conjunction with the crossbar to prevent lateral movement of some accessories with respect to the crossbar.

Some items may be stowed in an environmentally controlled environment. For example, the crossbar and accessories may be used within a refrigerator, freezer, or heated case. A baffle may be affixed to the crossbar to control airflow to maintain desired environmental conditions such as temperature, humidity, and so forth.

As noted above, the extensible bracket may decrease mechanical strain on the apparatus. For example, the apparatus may attach to a wall that has gondola uprights. At a first time, the distance between two gondola uprights supporting the apparatus may be a first distance. At a second time, the two gondola uprights may be jarred, or damaged, and the distance between the two gondola uprights changes to a second distance. The extensible bracket may allow the engagement features of the apparatus to compensate for the change in distance between the gondola uprights between the first time and the second time. Because the extensible bracket includes portions that may move relative to each other, mechanical strain on the apparatus due to the changed distance between the gondola uprights may be reduced. This reduced strain may allow weight sensors in the apparatus to provide more accurate measurements, reducing or eliminating errors due to imposed mechanical strain.

The extensible bracket may include different portions that move relative to each other. For example, the extensible bracket may include at least a first portion and a second portion. The first portion may attach to a fixture, such as a preexisting slatwall or to gondola uprights. The second portion may attach to a feature of the crossbar. The crossbar may have a long axis extending from a left end to a right end of the crossbar. With respect to the extensible bracket, the first portion may move relative to the second portion along an axis that is parallel to the long axis of the crossbar. The extensible bracket may use different mechanisms that allow for movement of the first portion of the extensible bracket relative to the second portion of the extensible bracket. As one example, the extensible bracket may include a low-friction insert positioned between the first portion and the second portion. The low-friction insert facilitates movement of the first portion relative to the second portion.

In traditional systems, accessories may slide or move from an installed position because of jostling, wear, damage, improper installation, and so forth. Such movement of an installed accessory may impede inventory management systems. For example, systems that maintain inventory data on items stowed by an accessory may become inaccurate if the accessory moves locations.

The apparatus or accessories attached thereto may include one or more sensors to determine information indicative of an interaction, such as a pick or place of an item. In a first implementation, the apparatus may communicate with one or more accessories that include weight sensors. An accessory may include a first portion that engages with the crossbar of the apparatus, a second portion that supports one or more loads, and a weight sensor with a first end attached to the first portion and a second end attached to the second portion. The accessory may include electronic circuitry that measures the weight of a load on the accessory and sends the weight data to an external device.

In a second implementation, the apparatus may have a first weight sensor and a second weight sensor. The first weight sensor may have an end attached to a first bracket and another end attached to the crossbar. The first bracket may attach to a wall. The second weight sensor may have an end attached to a second bracket and another end attached to the crossbar. The second bracket may attach to the wall. At least one of the two brackets may comprise the extensible bracket. Using the two weight sensors, the apparatus may measure the weight of loads supported the accessories affixed to the crossbar.

The apparatus may be used with various accessories, including a tether device, a locking cam device, or a clip device. A tether device may secure an accessory to the crossbar. For example, the crossbar of the apparatus may include a horizontal slot and a saddle mount. The tether device may have a collar that fits around a base of a saddle mount hook that is mounted on the apparatus. The tether device may have at least one arm that extends from the collar and attaches to one or more peg holes on the crossbar. By having the collar of the tether device around the base of the saddle mount hook and the arm of the tether device attached to a peg hole, the tether device prevents the saddle mount hook from sliding or shifting position. Similarly, the tether device may secure a slatwall hook to the crossbar.

A locking cam device may secure the apparatus to a slatwall. The locking cam device may fit between the front side of a bracket and the back side of a slot of the slatwall. The locking cam device may have arms and a cam portion. The arms may provide a handle and be angled to engage and secure the locking cam device between front of the bracket and the front of the slot. The cam portion may include two angled portions that are each narrower at a first end than a second end. The cam portion may be placed in front of the bracket and behind the front of the slot. After turning the locking cam device, the cam portion moves between the front of the bracket and the front of the slot. Because the portion of the locking cam device that fits in front of the bracket increases pressure and friction between the front of the bracket and the front of the slot, the apparatus is prevented from sliding within the slot. This maintains the apparatus in a fixed location, facilitating operation of an inventory management system.

A clip device may secure the apparatus to a slatwall. The apparatus may include a bracket that engages with a horizontal slot of a slatwall. The bracket may include a hole that is accessible after the apparatus is secured to the slatwall. The hole exposes a portion of the back of the slot. The clip device may fit within the hole, and when pressed, ridges of the clip device wedge between the engagement feature and a top part of the entry to the horizontal slot. Because the ridges of the clip device wedge between the engagement feature and the horizontal slot, friction is increased, and the apparatus is prevented from sliding within the slot. This maintains the apparatus in a fixed location, facilitating operation of an inventory management system.

The apparatus may include support structures for a front baffle and a rear baffle. For example, a first bracket may include a structure that supports attachment of a second bracket. The second bracket may support a front baffle. The first bracket may also include a support structure where a rear baffle may be attached. The first bracket may be a fixed bracket or an extensible bracket. In some examples, the baffles to not contribute to a weight measurement by a weight sensor used by the apparatus. Either a front baffle or a rear baffle may be used to control airflow for operation in an environmentally controlled case.

The facility may use sensors that are located overhead, on nearby structures, and so forth. These sensors may require line of sight to operate. For example, a camera may be used to acquire images of items being picked or placed from a particular location. The inventory management system may use these images to determine the item and quantity that was picked or placed. The baffles, or other portions of one apparatus may occlude the line of sight to another apparatus, impairing this functionality. To mitigate occlusion from sensors in the facility, the apparatus may utilize one or more of transparent baffles, brackets with different depths or front-to-back lengths, and so forth. For example, longer brackets may be used to bring a crossbar closer to the front of the environmentally controlled case, moving out from the "shadow" produced by a crossbar and baffle that is immediately above.

By using the devices and techniques described herein, operation of the facility may be improved. Apparatuses may be mounted to existing supports such as pegboards, slatwalls, and so forth. This allows for easy retrofitting, as well as convenient new installation. Once mounted, the crossbars allow use of accessories with a variety of different mechanical interfaces. This allows re-use of existing accessories, facilitating re-use, and providing flexibility to move the accessories in the facility. The crossbars may include weight sensors that provide weight data used for an inventory management system, further improving operation by allowing for automated determinations of items picked and placed, inventory on hand, and so forth. The various devices that prevent lateral movement of accessories or the entire apparatus maintain spatial consistency over time, further facilitating operation of the inventory management system.

Illustrative System

FIG. 1A illustrates a front view of an apparatus having an extensible bracket and a plurality of mechanical interfaces, according to some implementations.

The apparatus 100 comprises a crossbar 106. The crossbar 106 has a front side, a back side, a first end, a second end, a top side, and a bottom side. The crossbar 106 may comprise metal, plastic, ceramic, composite, and so forth. The crossbar 106 may be a unitary structure or may comprise one or more components. The components described in this disclosure may be formed via deposition, extrusion, casting, milling, stamping, and so forth. For example, the crossbar 106 may comprise metal formed by extrusion. The crossbar 106 may be a fixed length.

One or more mounting brackets 102 are used to attach the crossbar 106 to a support structure. For example, a first mounting bracket 102 may be connected to the first end of the crossbar 106 and a second mounting bracket 102 may be connected to the second end of the crossbar 106. The mounting bracket 102 may include one or more features to facilitate attachment to a support structure such as a gondola rack, wire grid, wall, and so forth. For example, the mounting bracket 102 includes upright engagement features 110 to engage a corresponding feature in an upright member of a gondola rack.

One or more of the mounting brackets 102 may comprise an extensible bracket 104. The extensible bracket 104 may include different portions that move relative to each other. For example, the extensible bracket 104 may include a first portion that may attach to a wall and a second portion that may attach to a feature of the apparatus 100. The extensible bracket 104 may extend by a length sufficient to mount the crossbar 106 to fixtures at different attachment locations. For example, the crossbar 106 may be a fixed length, but one or more extensible brackets 104 may extend the distance along the long axis of the crossbar 106 measured between engagement features 110 at a left end and a right end of the crossbar 106. The one or more extensible brackets 104 may extend the distance along the long axis of the crossbar from a first distance to a second distance. The first distance may be a first length of the crossbar 106. If the apparatus 100 comprises a single extensible bracket 104, then the second distance may be a second length associated with a first range of movement of the extensible bracket 104 along the long axis of the crossbar. If the apparatus 100 comprises two extensible brackets 104, then the second distance may be a sum of the second length and a third length associated with a second range of movement of the extensible bracket 104 along the long axis of the crossbar 106. A range of motion may be associated with an amount of movement that a first portion of the extensible bracket 104 may move relative to a second portion.

The apparatus 100 may implement one or more input/output (I/O) interfaces. The I/O interfaces may communicate with a server or other computing device using various communication protocols, including one or more of: Inter-Integrated Circuit (I2C), Serial Peripheral Interface bus (SPI), Universal Serial Bus (USB) as promulgated by the USB Implementers Forum, RS-232, and so forth. A connector 150 may be associated with one of the communication protocols. In other example, the apparatus 100 may use the I/O interfaces to communicate with other external devices, such as handheld devices that are in communication with an inventory management system.

The extensible bracket 104 may be attached to a weight sensor 108. For example, the weight sensor 108 may have a first end that is attached to a first portion of the extensible bracket 104 and may have a second end that is attached to the crossbar 106. As another example (not depicted), the extensible bracket 104 may be attached to the crossbar 106.

The crossbar 106 may have a long axis extending from a first end to a second end of the crossbar 106. With respect to the extensible bracket 104, the first portion may move relative to the second portion along an axis that is parallel to the long axis of the crossbar 106. The extensible bracket 104 may use different mechanisms for moving the first portion of the extensible bracket 104 relative to the second portion of the extensible bracket 104. As one example, the extensible bracket 104 may include an insert made of a material with a coefficient of friction that is relatively lower than the first portion or the second portion. The insert may comprise plastic, nylon, polytetrafluoroethylene (PTFE) plastic, and so forth. As another example, the first portion of the extensible bracket 104 may have one or more engagement features to guide movement of the second portion. The one or more engagement features may be lined or coated with a material that has a relatively lower coefficient of friction than the first portion or the second portion. For example, the material may comprise plastic, nylon, polytetrafluoroethylene (PTFE) plastic, and so forth.

In some implementations, the apparatus 100 may not include weight sensors 108, but may communicate with one or more accessories that include weight sensors 108. For example, the apparatus 100 may include electronic circuitry that receives data from the one or more accessories. An accessory may include a first portion that engages with the crossbar 106 of the apparatus 100, a second portion that supports one or more loads, and a weight sensor 108 with a first end attached to the first portion and a second end attached to the second portion. The accessory may include electronic circuitry that measures the weight of a load on the second portion and sends the weight data to the apparatus 100.

In some implementations, the apparatus 100 may have two weight sensors 108, a first weight sensor 108 and a second weight sensor 108. The first weight sensor 108 may have an end attached to the crossbar 106 and another end attached to a first bracket at a first end of the crossbar 106. The first bracket may attach to a wall. The second weight sensor 108 may have an end attached to the crossbar 106 and another end attached to a second bracket at a second end of the crossbar 106. The second bracket may attach to the wall. At least one of the two brackets may comprise an extensible bracket 104. Using the two weight sensors, the apparatus 100 may measure the weight of one or more loads supported by the interfaces for engaging accessories.

A mounting bracket 102 may comprise support structures 112 and 114 used to attach one or more baffle accessories. Baffle accessories are described with respect to FIGS. 6A and 6B. The support structure 112 may support a rear baffle. The rear baffle may be attached to the support structure 112 using one or more fasteners. Example fasteners include rivets, bolts, screws, cams, and so forth. The support structure 114 may support a bracket that supports a front baffle. The front baffle may be attached to the bracket using one or more fasteners. A baffle may constrain or control airflow proximate to the apparatus 100. For example, a baffle may be used in open-faced refrigerators to constrain or control airflow to maintain safe food temperatures. The baffle may be positioned relative to the crossbar 106 to constrain or control airflow directed towards one or more items supported by the crossbar 106.

The front side of the crossbar 106 may comprise a lower front surface and an upper front surface. In one implementation the lower front surface and the upper front surface may share a common plane. During typical installation, the lower front surface and the upper front surface may be aligned vertically. A front mounting slot 122 is arranged between the lower front surface and the upper front surface. The front mounting slot 122 may be configured to accept mounting features associated with a slatwall mechanical interface. For example, the front mounting slot 122 may receive a slatwall flange on an accessory. The front mounting slot 122 may have a first width at entry and a second width at an interior, describing an approximately "T" shaped cavity in cross section. The front mounting slot 122 may have a long axis that is parallel to a long axis of the crossbar 106. The front mounting slot 122 provides a first mechanical interface for supporting accessories.

The front mounting slot 122 may support a slatwall hook 134. The slatwall hook 134 may be secured at a particular location on the crossbar 106 by using a tether device 140.

Figure 3A:
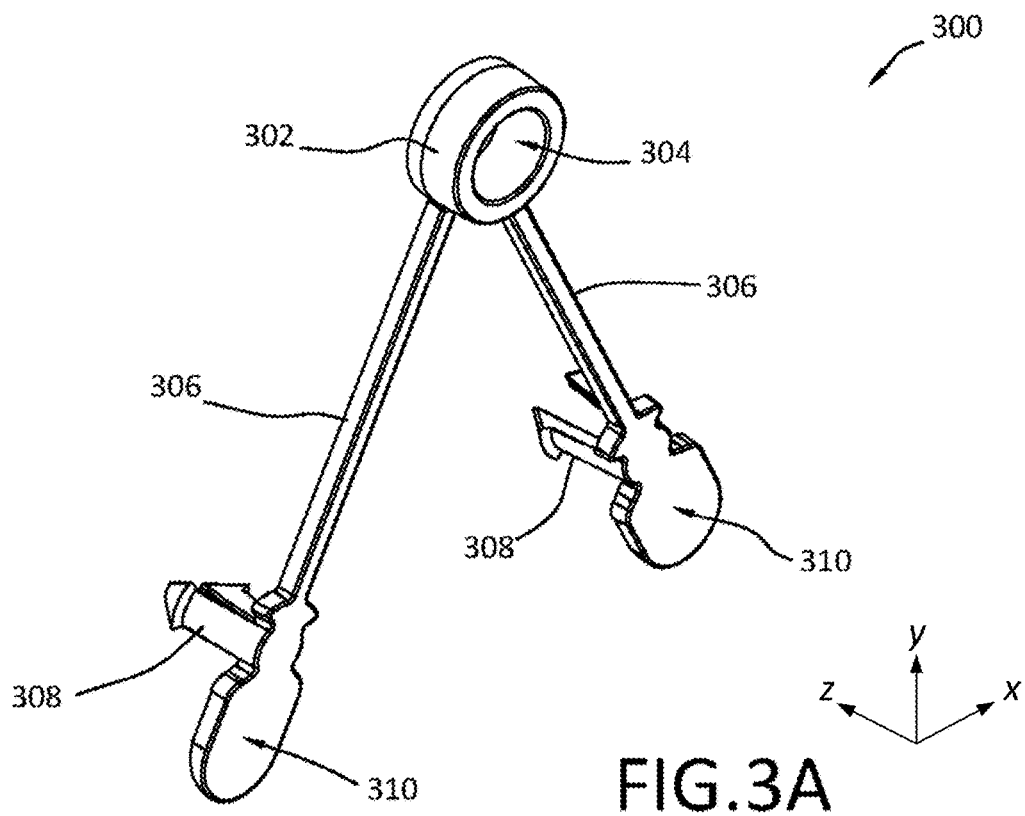
FIGS. 3A and 3B illustrate front and back views of an apparatus accessory, according to some implementations.
Figure 3B:
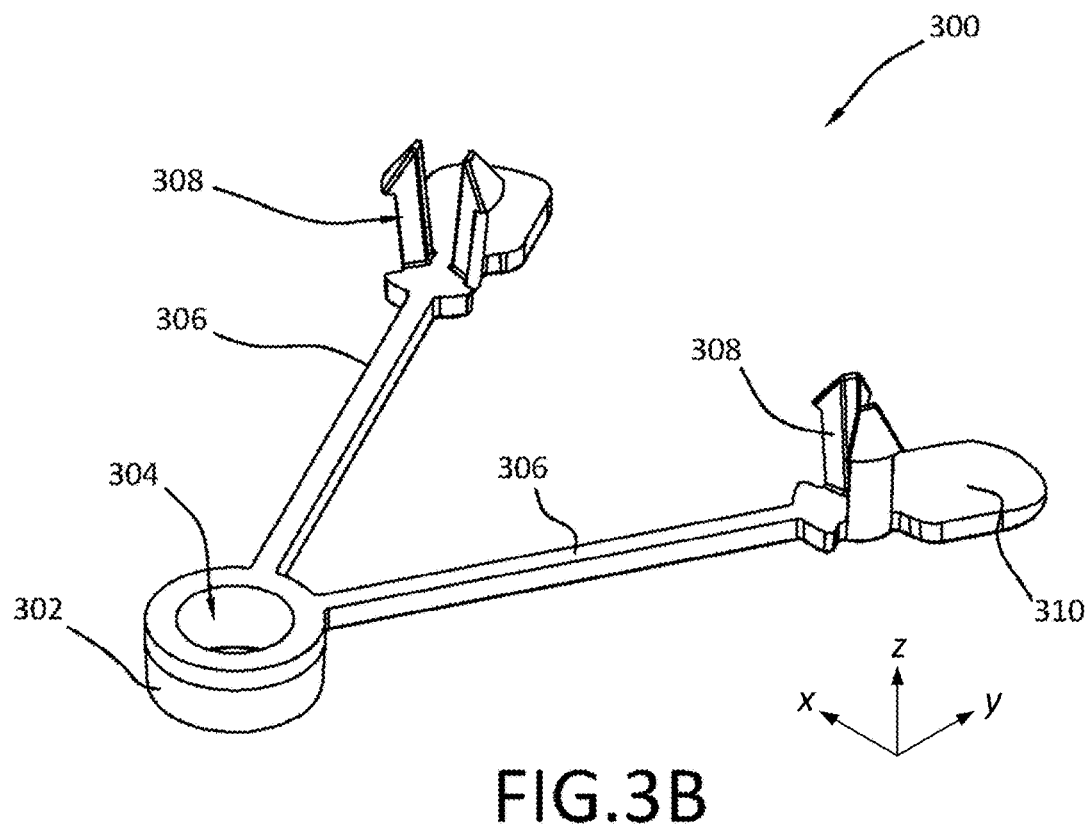

The tether device 140 is described with respect to FIGS. 3A and 3B. The tether device 140 may comprise a collar and at least one arm. The collar may fit around the hook of the slatwall hook 134. Each arm of the tether device 140 may include an end that has an engagement feature. The engagement feature may be a protrusion from the end that is shaped to fit within one of the multiple pegboard holes 124 of the crossbar 106. The protrusion may fit securely within a pegboard hole 124 and may maintain a current position of the collar relative to the pegboard hole 124, thereby maintaining the current position of the slatwall hook 134.

In some implementations, one or more indexing marks may be provided on one or more of the lower front surface or the upper front surface. For example, the indexing marks may be used to facilitate placement of accessories on the crossbar 106.

The lower front surface may have a plurality of holes 124. The plurality of holes 124 may be configured to accept mounting features associated with a pegboard mechanical interface. For example, the holes 124 may be spaced 25.4 millimeters (mm) on center and have a diameter of between 7 mm and 10 mm. The diameter of the holes 124 may be greater than typical to allow installation of accessories sized using English as well as metric units. For example, pegboard hooks sized for English dimensions with 1 inch (or 25.4 mm) on center may be attached to the crossbar 106 as well as pegboard hooks sized for metric units of 25 mm on center. The plurality of holes 124 may be arranged in a linear fashion that parallels the front mounting slot 122. In another implementation, the upper front surface may have a plurality of holes 124. In some implementations, both the lower front surface may have a first plurality of holes 124 and the upper front surface may have a second plurality of holes 124. The plurality of holes 124 may be arranged along a line that is parallel to the long axis of the crossbar 106. The plurality of holes 124 provide a second mechanical interface for supporting accessories.

An upper portion of the crossbar 106 comprises a ridge 120 that is proximate to, or may be a portion of, the upper front surface. An upper mounting channel is bounded by the ridge 120 and an upper rear surface. The upper mounting channel may comprise a long axis that is parallel to the long axis of the crossbar 106. During typical installation, the ridge 120 may be aligned horizontally along the long axis. A distance between an exterior or forward face of the upper front surface and an exterior or rearward face of the ridge 120 as it forms the upper mounting channel may permit a saddle mount hook to be supported. For example, the upper front surface and the ridge 120 together form a ridge onto which a saddle mount hook may be placed. The ridge 120 provides a third mechanical interface for supporting accessories.

The ridge 120 may support one or more saddle mount accessories. For example, the ridge 120 may support a saddle mount hook 130. The saddle mount hook 130 may be secured at a particular location on the crossbar 106 by the tether device 140. The tether device 140 is described with respect to FIGS. 3A and 3B. The collar of the tether device 140 may fit around the hook of the saddle mount hook 130. A first end of a first arm of the tether device 140 may comprise a first engagement feature. An example first engagement feature is depicted in FIGS. 3A and 3B. The first engagement feature may fit within a hole 124 to prevents the saddle mount hook 130 from moving locations due to bumps or from the addition or removal of items being held by the saddle mount hook 130.

As described in this disclosure, components may be affixed, connected, or otherwise joined to one another in several ways. For example, two components may have complementary features that mechanically engage one another, such as a tab and corresponding slot. In another example, fasteners such as rivets, bolts, screws, cams, and so forth may be used. These may be removable fasteners such as bolts and screws that allow components to be joined and disjoined as needed. In another example, two or more components may be attached using adhesives, welding, crimping, and so forth.

Figure 1B:
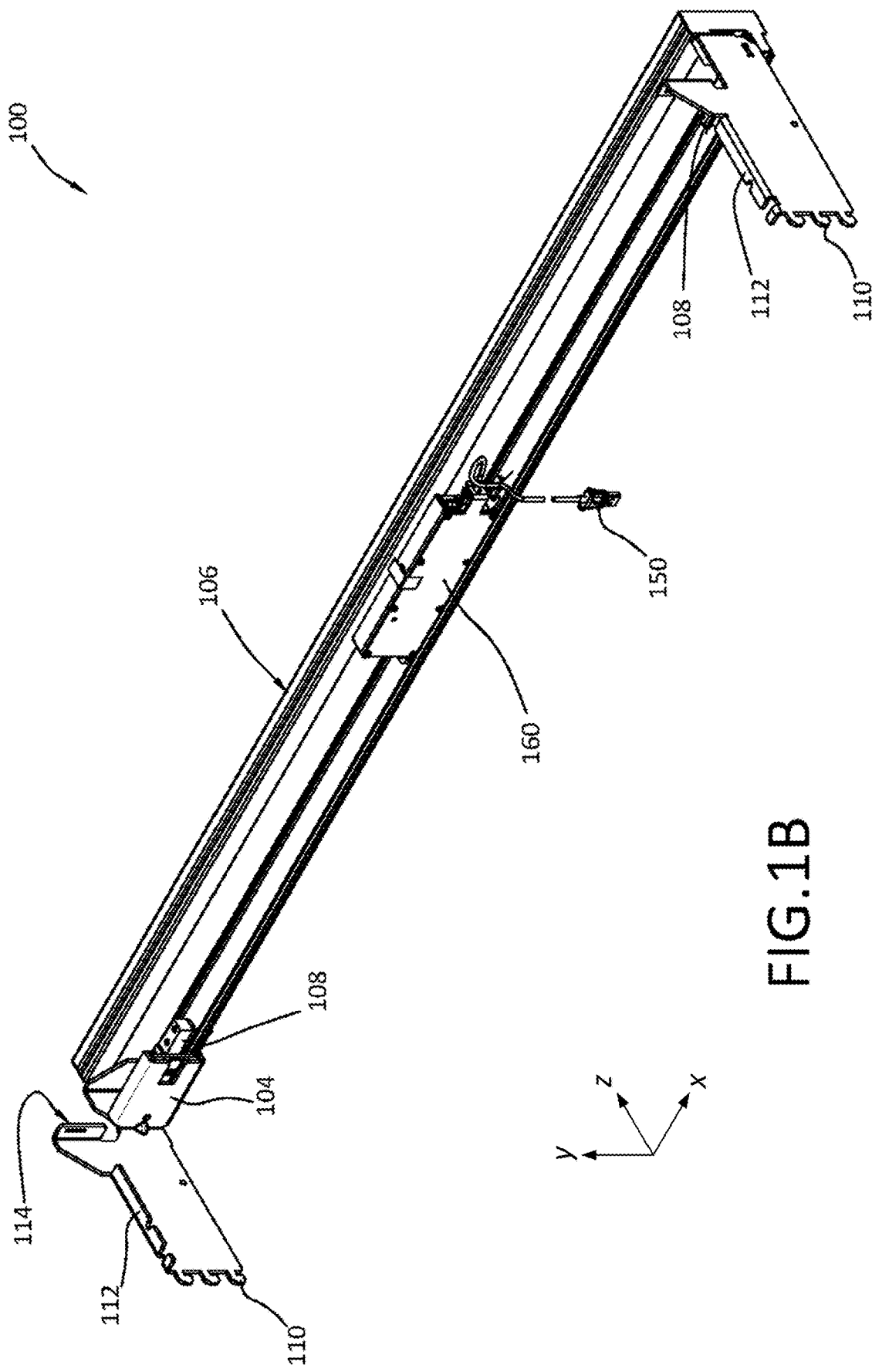
FIG. 1B illustrates a back view of an apparatus having an extensible bracket and a plurality of mechanical interfaces, according to some implementations.

FIG. 1B illustrates a back view of the apparatus 100 having an extensible bracket 104 and plurality of mechanical interfaces, according to some implementations.

In this view, a rear cover has been moved to reveal several components that may be present in some implementations of the apparatus 100. The apparatus 100 may include electronics protected by an electronics cover 160. The electronics may include a power supply, one or more processors, analog to digital converters, a wireless communication interface, and so forth.

One or more wiring harnesses may connect the electronics to one or more weight sensors 108. The weight sensors 108 may comprise load cells, piezoelectric transducers, and so forth. In this example, the weight sensors 108 are able to provide information about weight or weight changes of a load on the crossbar 106. For example, as items are added to or removed from accessories supported by the crossbar 106, weight data may be generated. This weight data may be sent to an inventory management system or other system.

The wiring harnesses may comprise individual insulated wires, ribbon cable, flexible printed circuit (FPC), and so forth. In some implementations at least a portion of the wiring harnesses may be affixed to a portion of the crossbar 106. For example, if the portion of the crossbar 106 comprises an electrical conductor, such as metal, the presence of the electrical conductor may act as a ground plane, reducing electrical interference. This reduction in electrical interference results in a significant improvement in the quality of the signal received by the electronics from the weight sensor 108. In one implementation, the crossbar 106 may comprise metal and at least a portion of the wiring harness may be taped, glued, or clipped to the metal.

In some implementations, the crossbar 106 may include one or more voids or spaces that are not filled with material. This may be done to reduce the overall weight of the crossbar 106, reduce the quantity of materials used, and so forth. In some implementations the voids may be omitted, filled, or have another member inserted there. This may be done to eliminate a void for potential contaminants to accumulate, to increase strength or rigidity of the crossbar 106, and so forth.

FIG. 2A illustrates, at 200, a top view of an apparatus having an extensible bracket and plurality of mechanical interfaces, according to some implementations.

In this view, the multiple portions of the extensible bracket 104 are assembled. The extensible bracket 104 may include a first portion, a second portion, and a third portion. The first portion may attach to a fixture, such as to a preexisting slatwall or to gondola uprights. The second portion may attach to a feature of the crossbar 106. In this example, the second portion attaches to a first end of a weight sensor 108. The weight sensor 108 may have a second end that is attached to the crossbar 106.

With respect to the extensible bracket 104, the first portion may move relative to the second portion along a direction that is parallel to the long axis of the crossbar 106. For example, if the long axis extends from a left end to a right end, the first portion moves relative to the second portion in either a left-to-right direction or a right-to-left direction. The extensible bracket 104 may use different mechanisms that allow for movement of the first portion relative to the second portion. As one example, the third portion may comprise a plastic insert positioned between the first portion and the second portion. The third portion may have a coefficient of friction that is lower than either the first portion or the second portion. For example, the plastic insert may comprise plastic, such as high-density polyethylene, nylon, polytetrafluoroethylene (PTFE) plastic, and so forth. For example, the first portion and the second portion may comprise metal, such as steel or aluminum. The third portion may comprise a first feature that engages with a second feature of the first portion. The third portion may also comprise a third feature that engages with a fourth feature of the second portion. For example, the first feature may be a first hole 124 that engages with the second feature. The second feature may be a first protrusion. The third feature may be a tab or other protrusion that engages with the fourth feature. The fourth feature may be a hole 124. In this example, the first feature and the third feature constrain movement of the first portion relative to the second portion.

Figure 2B:
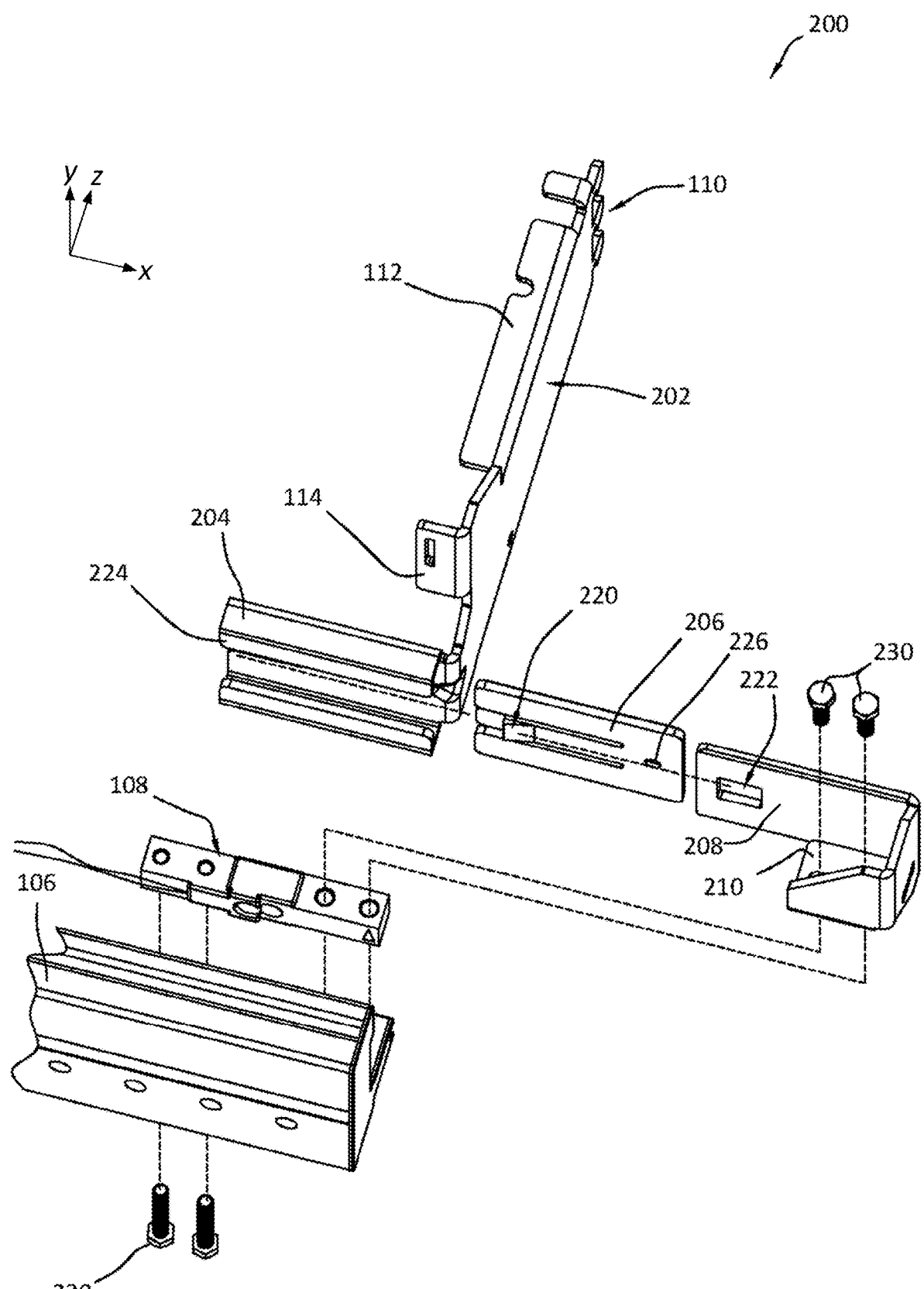
FIG. 2B illustrates an expanded view of an apparatus having an extensible bracket and a plurality of mechanical interfaces, according to some implementations.

FIG. 2B illustrates an expanded view of an apparatus having an extensible bracket and plurality of mechanical interfaces, according to some implementations.

The expanded view illustrates the multiple portions of the extensible bracket 104 and how the multiple portions fit together. The expanded view also illustrates how the extensible bracket 104 attaches to a weight sensor 108 and how the weight sensor 108 attaches to the crossbar 106.

In this example, the extensible bracket 104 comprises multiple portions, including a first portion 204, a second portion 208, a third portion 206, and a fourth portion 202. Other portions of the extensible bracket 104 are discussed with respect to FIGS. 1A and 1B. The first portion 204 extends perpendicularly from the fourth portion 202. The fourth portion 202 comprises engagement features 110 that affix the apparatus 100 to a fixture. The third portion 206 includes a first side, a second side, a tab 220, and a hole 226. The first portion 204 includes a third side, a top portion, and a bottom portion. The second portion 208 includes a fourth side, a hole 222, and an engagement feature 210. When the extensible bracket 104 is assembled, the first side of the third portion 206 is in contact with the third side of the first portion 204 and the second side of the third portion 206 is in contact with fourth side of the second portion 208.

In this example, the first portion 204 comprises a protrusion that engages with a hole 226 in the third portion 206. When the extensible bracket 104 is assembled, the protrusion fits within the hole 226 and keeps the third portion 206 in place. In other examples, the first portion 204 may keep the third portion 206 in place using other mechanisms. For example, the first portion 204 may comprise an indentation or a hole 226 and the third portion 206 may comprise a protrusion. In this example, when the extensible bracket 104 is assembled, the protrusion on the third portion 206 engages with the indentation or hole 226 in the first portion 204. In another example, the third portion 206 may use a tab 220 that engages with a hole 226 in the first portion 204 similar to how the tab 220 of the third portion 206 engages with the hole 222 of the second portion 208. A first length may be indicative of a length of the tab 220 as measured in a direction that is parallel to the long axis of the crossbar 106. A second length may be indicative of a length of the hole 222 as measured in the direction that is parallel to the long axis of the crossbar 106. The first length may be less than the second length by an amount associated with a distance allowed for movement of the first portion 204 relative to the second portion 208.

In this example, the top portion of the first portion 204 may be shaped to prevent the second portion 208 and the third portion 206 from moving in a direction that is front-to-back or back-to-front. The front of the apparatus and the back of the apparatus are described above with respect to FIGS. 1A and 1B. In this example, the top portion of the first portion 204 comprises a first ridge that extends perpendicularly a first distance from the third side. The first distance is slightly greater than a sum of the thickness of the fourth side of the second portion 208 and the thickness of the third portion 206. As depicted, the top portion also comprises a first containment side 224 that extends perpendicularly from the first ridge. The first containment side 224 and the first ridge together form a "U" shape. Similarly, the bottom portion comprises a second ridge and a second containment side 224 that together form a "U" shape.

In this example, to assemble the extensible bracket 104, the third portion 206 may be inserted into the first portion 204. When inserted, the third portion 206 is contained by the third side, the top portion, and the bottom portion. When inserted, the protrusion on the first portion engages with the hole 226 and the tab 220 engages with the hole 222. A view of the extensible bracket 104 as assembled is depicted in FIG. 2A. The third portion 208 may comprise a material that is flexible, including plastic, nylon, polytetrafluoroethylene (PTFE) plastic, and so forth. Because the third portion 208 is flexible, the portion of the third portion 206 associated with the tab 220 may flex to fit within hole 222.

In some embodiments, the first portion 204 of the extensible bracket 104 may have one or more engagement features to guide movement of the second portion 208. For example, the inside of the top portion and the inside of the bottom portion may be lined or coated with a material that has a relatively lower coefficient of friction than the first portion or the second portion 208. For example, the material may comprise plastic, nylon, polytetrafluoroethylene (PTFE) plastic, and so forth. In this example, instead of the ends of the "U" shaped top and bottom portions being open, the ends of the "U" shaped top and bottom portions may be enclosed around the fourth side of the second portion 208. Also, in this example, the length of the fourth side of the second portion 208 may be shorter than a length of the third side of the first portion 204 by an amount associated with a distance allowed for movement of the first portion 204 relative to the second portion 208.

The third portion 208 may attach to a first structure associated with support of the crossbar 106. For example, the first structure may be a weight sensor 108 or a portion of the crossbar 106 where bolts 230 may fasten the third portion 208 to the crossbar 106. In this example, bolts 230 fit through holes in the engagement feature 210 of the third portion 208 and into holes 226 of the weight sensor 108, as indicated by the dotted lines in FIG. 2B from the bolts 230 to the weight sensor 108. The weight sensor 108 may attach to the crossbar 106 using bolts 230 that pass through the bottom side of the crossbar 106 into holes 226 in the weight sensor 108, as indicated by the dotted lines in FIG. 2B from the bolts 230 to the weight sensor 108 through the crossbar 106.

FIGS. 3A and 3B illustrate, at 300, front and back views of an apparatus accessory, according to some implementations.

The apparatus accessory is a tether device 140. The tether device 140 may have a first feature that engages a portion of saddle mount accessory or a portion of a horizontal slot accessory. For example, the first feature may be collar 302 that fits around a base of a saddle mount hook that is mounted on the apparatus. The tether device 140 may have at least one arm 306 that extends from the collar 302 and attaches to one or more peg holes 124 on the crossbar 106. The arm 306 may have an engagement feature that engages with a peg hole of a pegboard hole or that engages with a horizontal slot of a slatwall. By having the collar 302 of the tether device 140 around the base of the saddle mount hook and an arm 306 of the tether device 140 attached to a peg hole 124, the tether device 140 prevents the saddle mount hook from sliding or shifting position from left to right or from right to left. Similarly, the tether device 140 may secure a slatwall hook to the crossbar 106. The collar 302 may comprise a hole 304 may be circular and have a diameter that fits around a hook of a saddle mount hook or a slatwall hook. The tether device 140 may comprise a flexible material. For example, the tether device 140 may comprise an elastomeric material that may bend or stretch. Because the tether device 140 may bend or stretch, the one or more arms 306 of the tether device 140 may be positioned in different locations relative to the collar 302. For example, the tether device 140 may comprise an elastomeric material. In another example, the engagement feature may comprise a flexible post, similar to post 410 described with respect to FIG. 4. The post of the engagement feature may have a diameter that is slightly larger than the distance between the bottom ledge of a horizontal slot and the top ledge of a horizontal slot. Because the post is slightly larger than the opening of the horizontal slot, force may be used to engage the post with the horizontal slot by wedging the post within the horizontal slot. After the post is engaged, the tether device 140 prevents the saddle mount hook or a slatwall hook from sliding or shifting position.

In some implementations, the collar 302 may comprise different shapes. For example, the collar 302 may comprise an opening that allows the collar 302 to clip onto a base of an accessory. For example, the accessory may be a saddle mount hook, a slatwall hook, or some other accessory that may be attached to one of the plurality of accessory interfaces of the crossbar 106. If a hook accessory that is attached to the crossbar 106 is supporting items before a tether device 140 is installed, then the clip feature allows the tether device 140 to secure the position of the hook without removing items being supported by the hook. In some implementations, the collar 302 may be shaped fit around, or attach to, different portions of other accessories. For example, at least a portion of a hook may not be circular, and the collar of the tether device may be shaped to fit the portion of the hook that is not circular.

A first end of a first arm 306 of the tether device 140 may comprise a first engagement feature 308. The first engagement feature 308 may comprise a first side and a second side. The first side may comprise a flat area 310 and is usable for applying pressure to the first engagement feature 308. The second side may comprise the engagement feature 308 that fits within a pegboard hook hole, such as one of the peg holes 124. An engagement feature 308 may have two flexible extensions, a first flexible extension and a second flexible extension.

Each flexible extension may have an end attached to the second side and an end that is beveled. The first flexible extension may have a first end and a second end. The first end is attached to the second side and the second end is beveled. The third end is attached to the second side and the fourth end is beveled. The second flexible extension may have a third end and a fourth end. Each flexible extension may have an inner portion and an outer portion. The inner portions of the flexible extensions are closest to each other. The outer portions of the flexible extensions are farthest from each other.

A first distance may indicate a distance from a first outer portion of the first end of the first flexible extension to a second outer portion of the third end of the second flexible extension. The first distance may be equal to or slightly smaller than the diameter of a peg hole 124. A second distance may indicate a distance from a third outer portion of the second end of the first flexible extension to a fourth outer portion of the fourth end of the second flexible extension. The second distance may be equal to or slightly larger than the diameter of a hole 124. Because the flexible extensions are flexible, they may bend to fit within a hole 124. Bending of the flexible extensions to fit in the hole 124 results in a secure engagement of the first engagement feature 308 with a hole 124. The secure engagement prevents the slatwall hook from moving locations due to bumps or from the addition or removal of items being held by the slatwall hook.

Figure 4A:
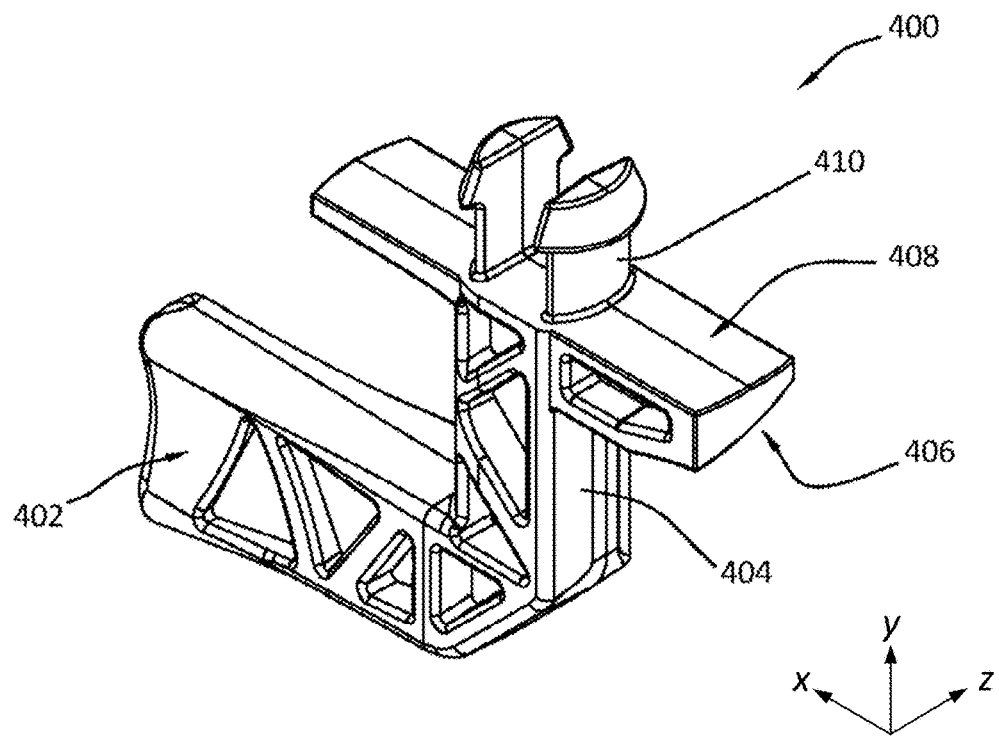
FIGS. 4A and 4B illustrate front and back views of an apparatus accessory, according to some implementations.
Figure 4B:
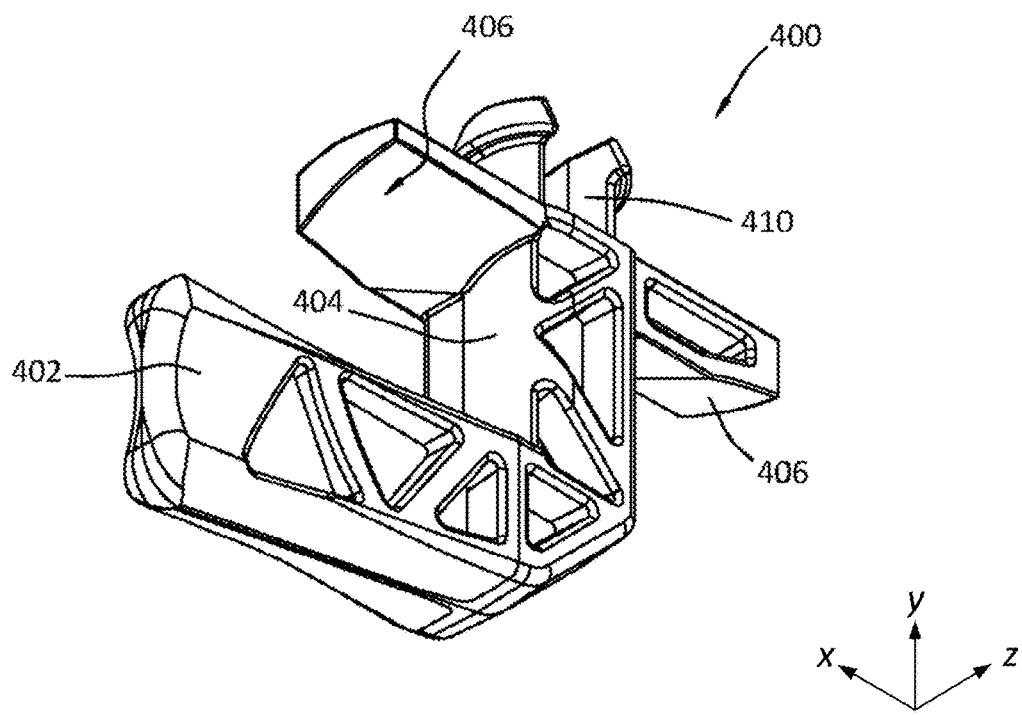

FIGS. 4A and 4B illustrate front and back views of an apparatus accessory, according to some implementations.

A locking cam device 400 may secure the apparatus 100 to a slatwall. The locking cam device 400 may fit between a front side of an engagement feature of a bracket and the back side of a horizontal slot of the slatwall. The engagement feature of the bracket may engage with the slatwall. The locking cam device 400 may comprise a thumb lever 402, a shaft 404, a post 410, and two arms that each include a respective face 408 and cam surface 406. The shaft may comprise a first end and a second end. The first arm may extend in a first direction away from the first end. The first arm may comprise a first cam. The second arm may extend in a second direction away from the first end. The second arm may comprise a second cam. The first direction may be an opposite direction of the second direction. The engagement feature of the bracket may have a hole with a diameter that fits the post 410. The front side of the engagement feature may face the crossbar 106 and a back side of the engagement feature may face the inside of the horizontal slot.

To engage the locking cam device 400, the post 410 may be inserted into the hole of the engagement feature of the bracket. After insertion, the arms of the locking cam device 400 may be between the front side of the engagement feature and the outer portion of the horizontal slot. The post 410 may be inserted such that the arms extend along an axis that is parallel to the horizontal slot. After the post 410 is inserted into the hole of the engagement feature, the locking cam device 400 may be turned clockwise using the thumb lever 402. After turning, the arms of the locking cam device 400 may wedge between the front side of the engagement feature and the outer portion of the horizontal slot. Because the arms of the locking cam device that fits in front of the bracket increases pressure and friction between the front of the bracket and the front of the horizontal slot, the apparatus 100 is prevented from sliding within the horizontal slot.

In some implementations, the locking cam device 400 may be used to secure a slatwall accessory to the horizontal slot 122 of the crossbar. For example, a slatwall hook may include a hole in a base that engages with the horizontal slot. Similar to the above example for securing a bracket, to engage the locking cam device 400 with the slatwall hook, the post 410 may be inserted into the hole of the base of the slatwall hook and turned clockwise using the thumb lever 402.

Figure 5A:
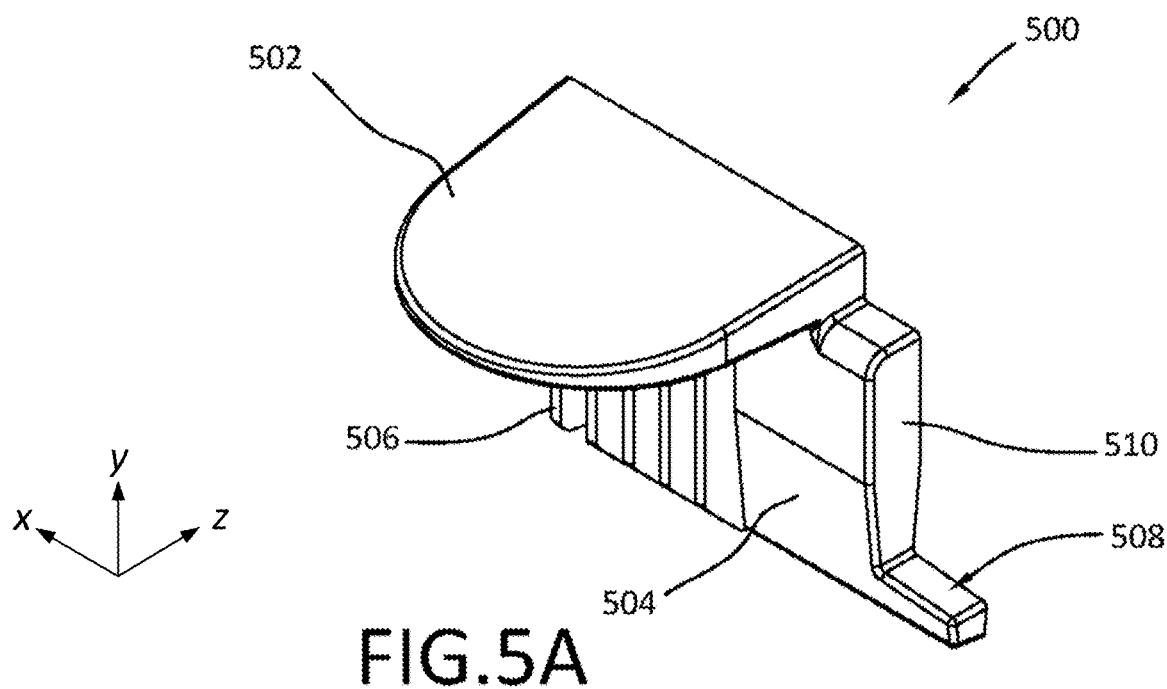
FIGS. 5A and 5B illustrate top and bottom views of an apparatus accessory, according to some implementations.
Figure 5B:
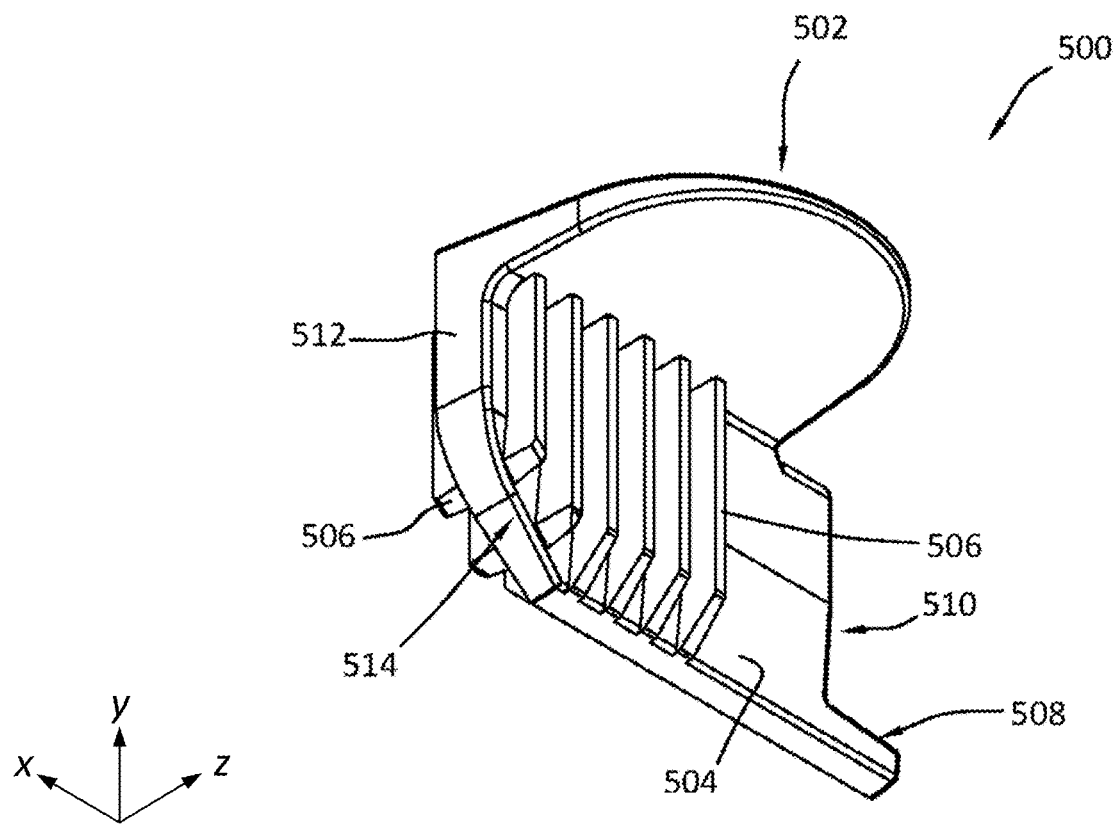

FIGS. 5A and 5B illustrate top and bottom views of an apparatus accessory, according to some implementations.

A clip device 500 may prevent the apparatus 100 from sliding within a horizontal slot of a slatwall. The apparatus may include a bracket that includes an engagement feature that engages with a horizontal slot of a slatwall. The engagement feature may include a hole that is accessible after the apparatus 100 is secured to the slatwall. The hole exposes a portion of the back of the horizontal slot. The clip device 500 may fit within the hole, and when pressed, ridges of the clip device 500 wedge between the engagement feature and a top part of the entry to the horizontal slot. Because the ridges of the clip device wedge between the engagement feature and the horizontal slot, friction is increased and the apparatus 100 is prevented from sliding within the slot.

The clip device 500 may comprise a first portion and a second portion. The first portion may comprise a first feature, such as a surface 502. The second portion may comprise a body 504. The body 504 may comprise a first side 510, a second side 512, a prong 508, a curved portion 514, and ridges 506 on both sides of the body 504. Ridges 506 on the first side 510 may be a first one or more ridges 506. Ridges 506 on the second side 512 may be a second one or more ridges 506. The hole in the engagement feature may be rectangular and slightly longer, as measured along the long axis of the crossbar 106, than a distance from the first side 510 to the second side 512. The clip device 500 may comprise a material that is flexible or deformable, including plastic, nylon, polytetrafluoroethylene (PTFE) plastic, and so forth. For example, if the clip device 500 comprises flexible material, the ridges 506 may bend to fit between the engagement feature and the entry of the horizontal slot. As another example, if the clip device 500 comprises deformable material, the ridges 506 may deform to fit between the engagement feature and the entry of the horizontal slot.

To engage the clip device 500, the prong 508 may be inserted behind a left end of the hole and in front of the back side of the horizontal slot. Once inserted, the prong 508 may serve as a fulcrum as the clip device 500 is pressed into a space between the engagement feature and the entry to the horizontal slot. The curved portion 514 may allow the second side 512 to be slightly past the edge of the hole while allowing the clip device 500 to move at least partially into the hole. Pressure applied to the surface 502 wedges the ridges 506 of the clip device 500 between the engagement feature and a top part of the entry to the horizontal slot. After insertion, the surface 502 faces away from the horizontal slot and toward the back of the apparatus 100. The surface 502 may be flat, convex, or concave. In one example, the surface 502 may be smooth. In another example, the surface 502 may be textured to provide a non-slip feature.

In some implementations, the clip device 500 may be used to secure a slatwall accessory to the horizontal slot 122 of the crossbar. For example, a slatwall hook may be installed into the horizontal slot 122. Similar to the above example for securing a bracket, to engage the clip device 500 with the slatwall hook, the prong 508 may be inserted behind a left end of the hole and in front of the back side of the horizontal slot. Once inserted, the prong 508 may serve as a fulcrum as the clip device 500 is pressed into a space between the slatwall hook and the entry to the horizontal slot.

Figure 6A:
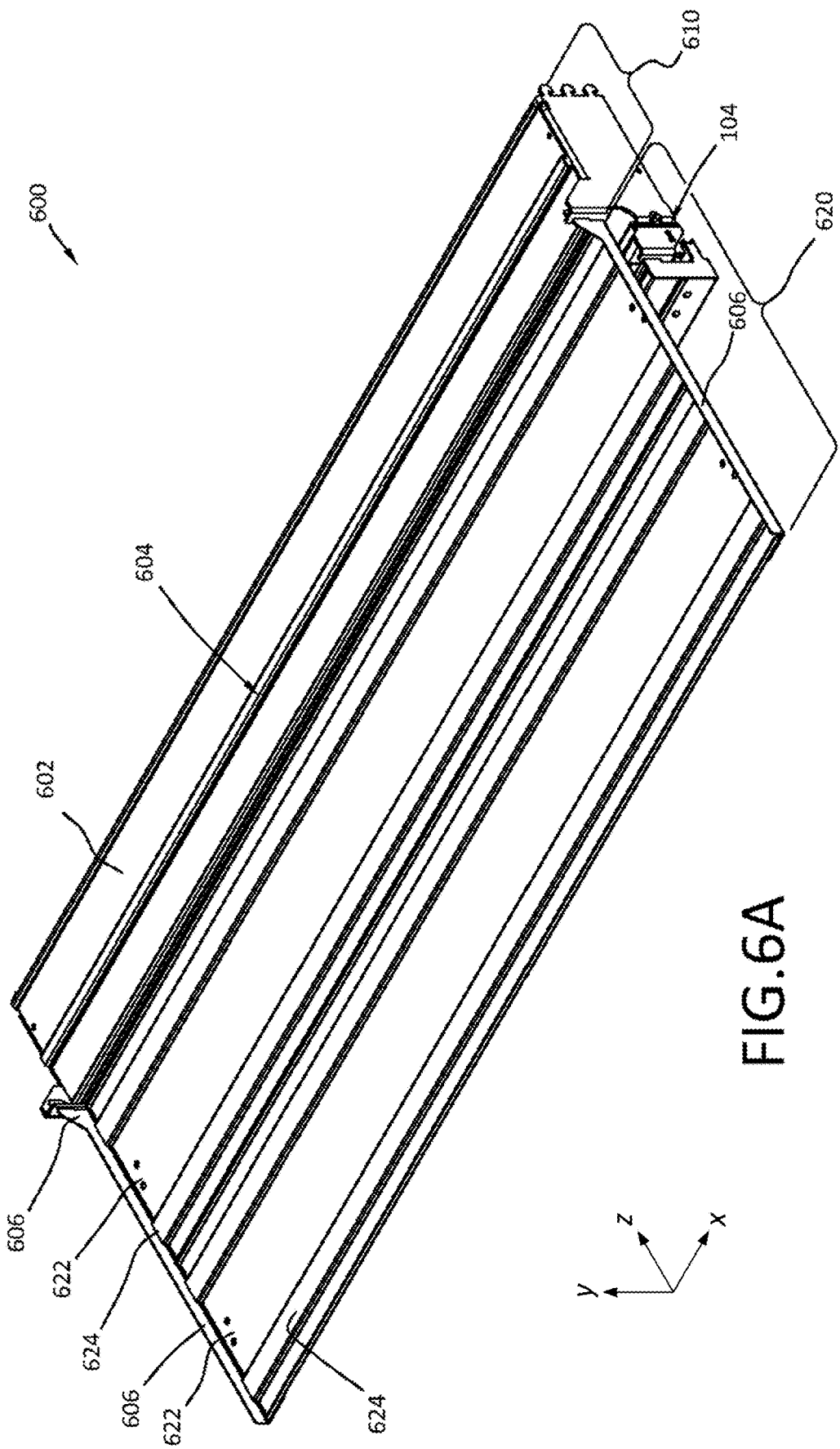
FIGS. 6A and 6B illustrate an apparatus accessory, according to some implementations.
Figure 6B:
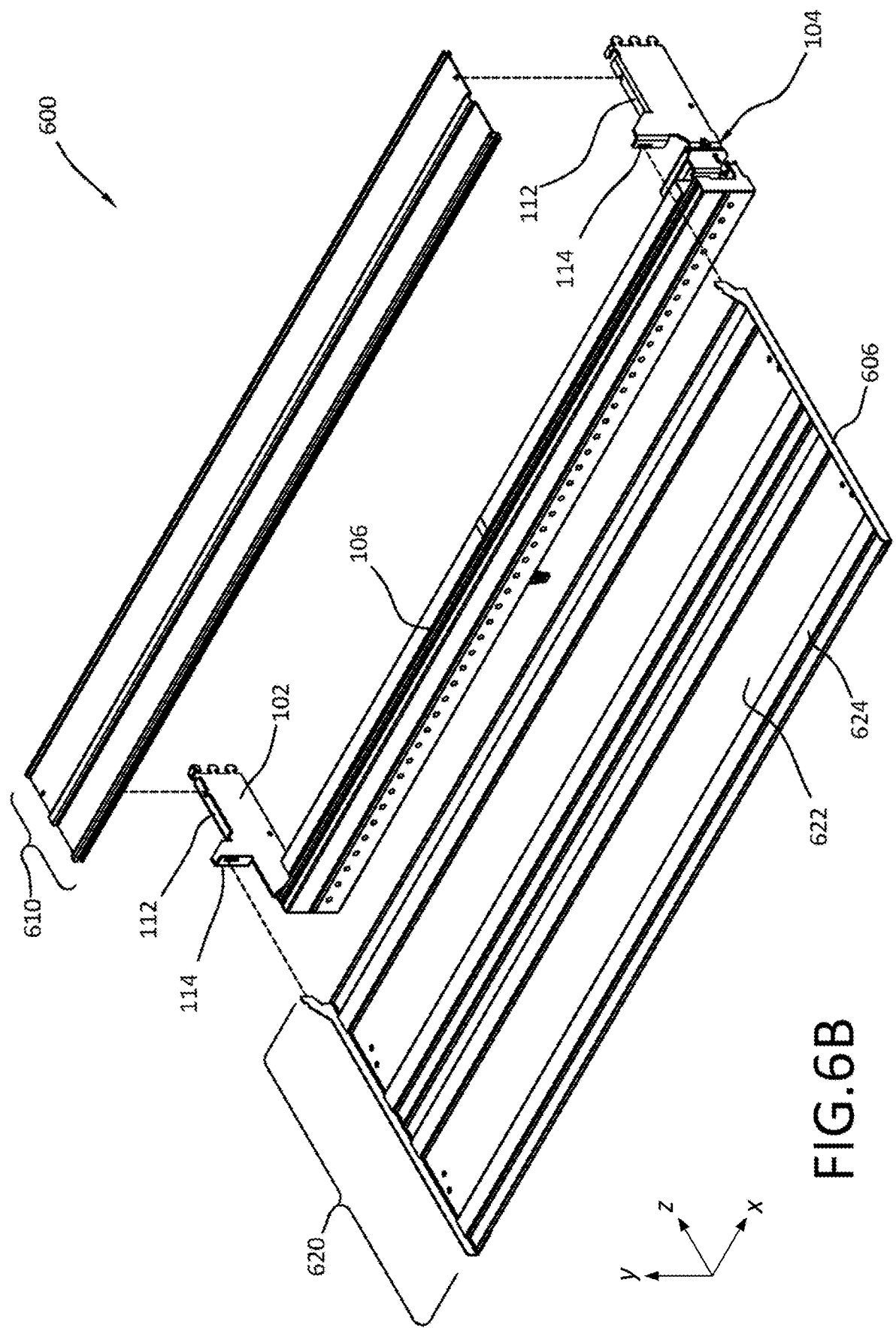

FIGS. 6A and 6B illustrate an apparatus accessory, according to some implementations.

The apparatus 100 may be used to support one or more baffles 610 and 620. The apparatus 100 may include support structures for a front baffle 620 and a rear baffle 610. For example, a first support structure may be a bracket mount 114. A second support structure may be bracket mount 112. The front baffle 620 may be affixed to bracket 606 using one or more fasteners. Bracket 606 may be attached to the bracket mount 114 using one or more fasteners. The front baffle 620 may comprise one or more sections 622. The rear baffle 610 may comprise one or more sections 602. A number of sections 602, 622 used by the apparatus 100 may depend on how the baffles 610, 620 are installed to control airflow. A section 622 may be a standard width, and a length of the bracket 606 may be a multiple of the width. A section length may be measured from the left end to the right end of the crossbar 106, and a section width may be measured from front-to-back. A number of sections 622 used by the apparatus 100 may also depend on whether items stowed by the apparatus 100 are visible to one or more cameras of the inventory management system. The front baffle 620 may include one or more ridges 624. The rear baffle 610 may include ridges 604. A ridge 604 and 624 may increase rigidity of a baffle, which may improve ruggedness and durability.

In some examples, the baffles 610 and 620 do not contribute to a weight measurement by a weight sensor 108 used by the apparatus 100. Either a front baffle 620, a rear baffle 610, or both the front baffle 620 and the rear baffle 610 may be used to constrain airflow for operation in a temperature-controlled case. In some examples, a baffle 610, 620 may comprise a metal, such as aluminum. In other examples, baffles 610 or 620 may comprise a clear or transparent plastic material, such as an acrylic material or a polycarbonate material. In this example, because the baffle 610, 620 is clear or transparent, installation of a baffle 610, 620 does not obstruct the line of sight of the camera to the items stowed by the apparatus 100.

The implementations described above are provided for illustration, and not necessarily as limitations. For example, the fixtures may support different numbers of accessories, combinations of different accessories on the same fixture, and so forth.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Figure 7:
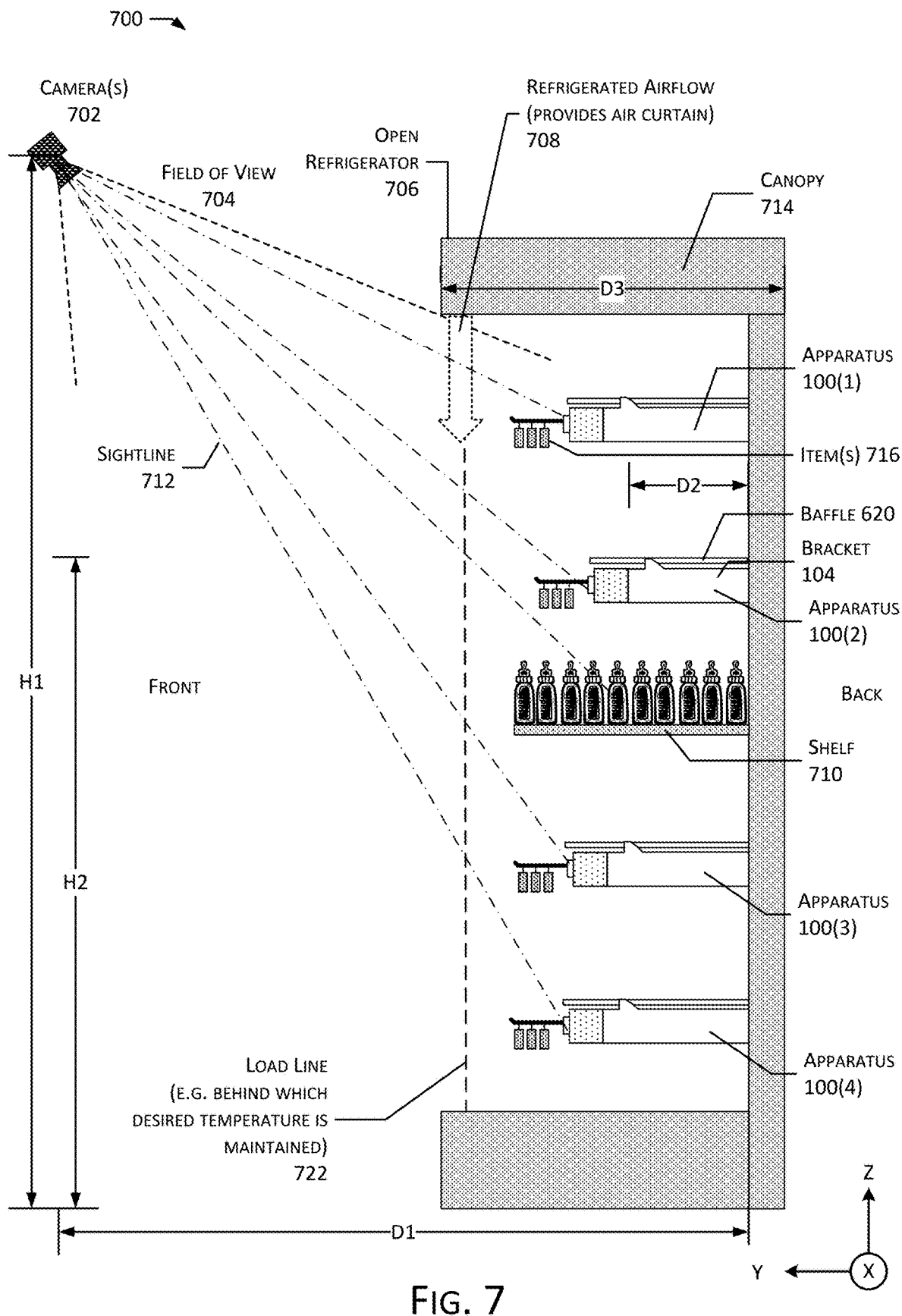
FIG. 7 illustrates a side view of an open refrigerator installed with multiple apparatus, according to some implementations.

FIG. 7 illustrates a side view 700 of an open refrigerator installed with multiple apparatus, according to some implementations. While an open refrigerator is shown, other cases providing environmentally controlled conditions, both open or closed, may be used. For example, a hot case with a door may be used. In another example, a closed freezer case may be used.

An open refrigerator 706 may be installed with one or more apparatus 100(1)-(4) as well as other devices, such as a shelf 710 to stow items 716. The shelf 710 may include one or more sensors, such as weight sensors. One or more sensors, such as a camera 702, may be installed. For example, the camera 702 may be installed overhead, at height H1 above ground, at some distance D1 from the open refrigerator 706. The camera 702 has a field of view 704. The open refrigerator 706 may keep items 716 at a desired temperature by using a refrigerated airflow 708 that provides an air curtain. Items 716 that are stowed behind the load line 722 created by the air curtain may be maintained at the desired temperature.

Data from one or more sensors, such as the cameras 702, weight sensors in the apparatus 100, and so forth, may be used to update an inventory management system when stowed items 716 are added or removed from the open refrigerator 706. If a sightline 712 from the camera 702 to a stowed item 716 becomes occluded, then the inventory management system may have less usable image data acquired by the camera 702, reducing the accuracy of information determined about the pick or place that has occurred. The camera 702 may be occluded by, for example, a canopy 714 of the open refrigerator 706, one or more shelves 710, an apparatus 100 or portion thereof such as a baffle 620. The baffle 620 may be positioned relative to the crossbar 106 to constrain or control airflow directed towards one or more items 716 supported by the crossbar 106. In this example, the baffle 620 is above the crossbar 106 and above the one or more items 716.

Various techniques may be used to minimize occlusion of sightlines 712. In one implementation, a bracket 104 may be selected that provides a desired distance D2 that places the crossbar 106 within an unobstructed sightline 712 of the camera 702. Brackets 104 with different dimensions may be provided, allowing selection of the desired distance D2. In some implementations the brackets 104 may be adjustable, allowing a single bracket design to be used to provide various different distances D2 once installed.

In some implementations, at least a portion of the baffle 620 may be transparent. For example, a front section of the baffle 620 may comprise optically transparent acrylic, preventing the sightline 712 from being occluded.

The determination of the distance D2 may be based at least in part on one or more dimensions associated with the geometry of the system. For example, the height H1 of the camera 702, the distance D1 of the camera 702 from the open refrigerator 706, the distance D3 that the canopy 714 extends away from a back of the open refrigerator 706, and so forth.

Figure 8:
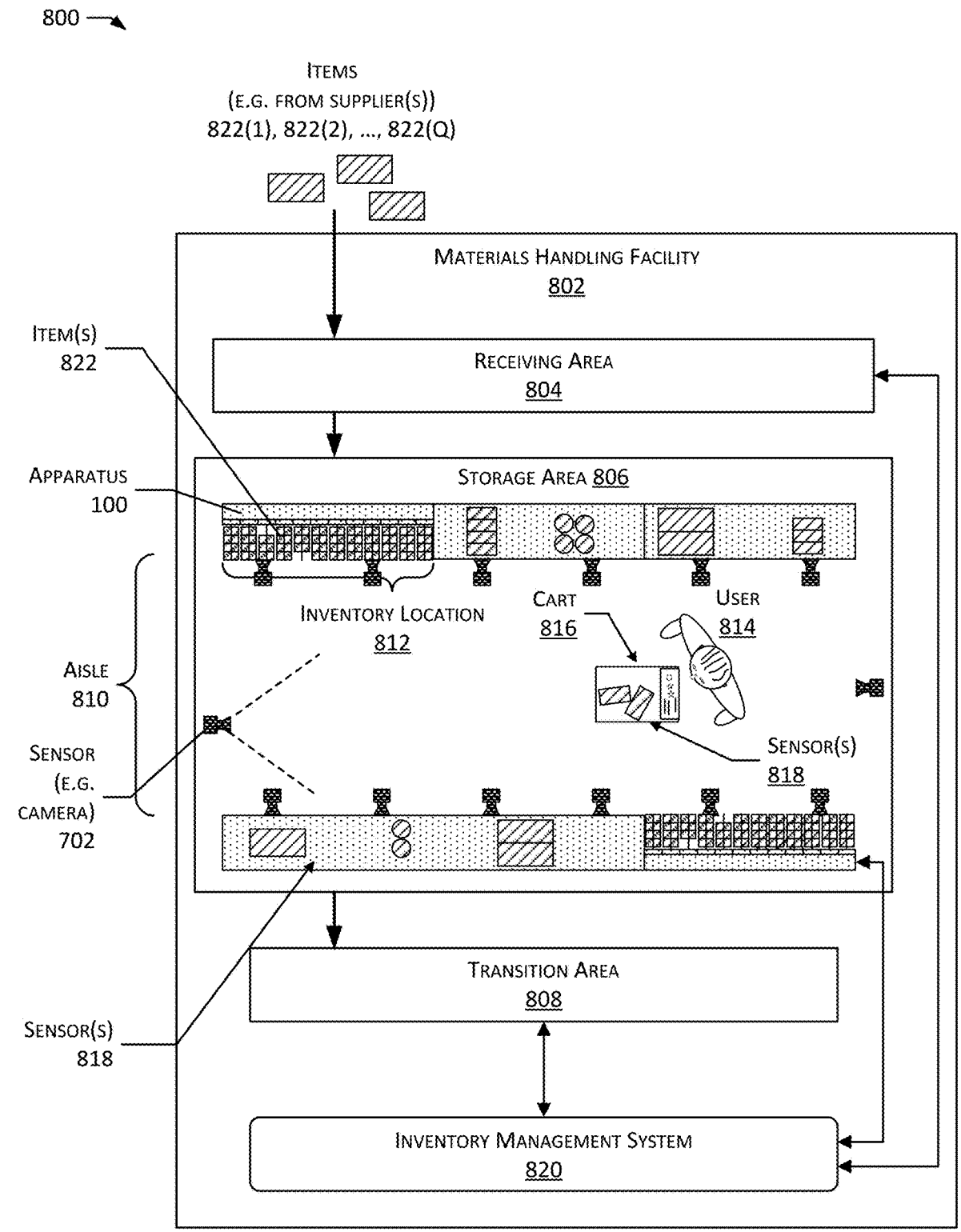
FIG. 8 is a block diagram illustrating a materials handling facility (facility) using the device, according to some implementations.

FIG. 8 is a block diagram 800 illustrating a material handling facility (facility) 802 using the apparatus 100, according to some implementations. A facility 802 comprises one or more physical structures or areas within which one or more items 822(1), 822(2), . . . , 822(Q) may be held. The items 822 may comprise physical goods, such as books, pharmaceuticals, repair parts, electronic gear, and so forth.

The facility 802 may include one or more areas designated for different functions with regard to inventory handling. In this illustration, the facility 802 includes a receiving area 804, a storage area 806, and a transition area 808.

The receiving area 804 may be configured to accept items 822, such as from suppliers, for intake into the facility 802. For example, the receiving area 804 may include a loading dock at which trucks or other freight conveyances unload the items 822. In some implementations, the items 822 may be processed, at the receiving area 804, to generate at least a portion of the item data. For example, an item 822 may be weighed, imaged or otherwise scanned to develop reference images or representations of the item 822 at the receiving area 804.

The storage area 806 is configured to store the items 822. The storage area 806 may be arranged in various physical configurations. In one implementation, the storage area 806 may include one or more aisles 810. The aisle 810 may be configured with, or defined by, inventory locations 812 on one or both sides of the aisle 810. The inventory locations 812 may include one or more of a platform, a rack, a case, a cabinet, a bin, a floor location, or other suitable storage mechanisms for holding, supporting, or storing the items 822. For example, the inventory locations 812 may comprise the apparatus 100 with multiple accessories that provide a plurality of lanes.

The inventory locations 812 may be affixed to the floor or another portion of the structure of the facility 802. The inventory locations 812 may also be movable such that the arrangements of aisles 810 may be reconfigurable. In some implementations, the inventory locations 812 may be configured to move independently of an outside operator. For example, the inventory locations 812 may comprise a rack with a power source and a motor, operable by a computing device to allow the rack to move from one location within the facility 802 to another.

One or more users 814 and carts 816(1) or other material handling apparatus may move within the facility 802. For example, the user 814 may move about within the facility 802 to pick from or place the items 822 in various inventory locations 812, placing them in the cart 816 for ease of transport. The cart 816 is configured to carry or otherwise transport one or more items 822. For example, the cart 816 may include a basket, cart, bag, bin, and so forth. In other implementations, other material handling apparatuses such as robots, forklifts, cranes, aerial drones, and so forth, may move about the facility 802 picking, placing, or otherwise moving the items 822. For example, a robot may pick an item 822 from a first inventory location 812(1) and move the item 822 to a second inventory location 812(2).

While the storage area 806 is depicted as having one or more aisles 810, inventory locations 812 storing the items 822, sensors 818, and so forth, it is understood that the receiving area 804, the transition area 808, or other areas of the facility 802 may be similarly equipped. Furthermore, the arrangement of the various areas within the facility 802 are depicted functionally rather than schematically. For example, in some implementations, multiple different receiving areas 804, storage areas 806, and transition areas 808 may be interspersed rather than segregated in the facility 802.

The facility 802 may include, or be coupled to, an inventory management system 820. The inventory management system 820 is configured to interact with the user 814 or devices such as sensors 818, robots, material handling equipment, computing devices, and so forth, in one or more of the receiving area 804, the storage area 806, or the transition area 808.

During operation of the facility 802, the weight sensors 108 and other sensors 818 may be configured to provide sensor data, or information based on the sensor data, to the inventory management system 820. In addition to data obtained from the weight sensors 108 in the apparatus 100, the sensor data may include image data, non-image data, and so forth. Sensor data is described with respect to FIG. 10 and is stored as sensor data 1026. The sensors 818 may include, but are not limited to, weight sensors 108, cameras 702, and so forth. The sensors 818 may be stationary or mobile, relative to the facility 802. For example, the facility 802 may include cameras 702 to obtain images of the user 814 or other objects in the facility 802. In another example, the inventory locations 812 may contain weight sensors 108 to acquire weight sensor data of items 822 stowed therein, cameras 702 to acquire images of picking or placement of items 822 on shelves, and so forth.

The inventory management system 820 or other systems may use the sensor data 1026 to track the location of objects within the facility 802, movement of the objects, or provide other functionality. Objects may include, but are not limited to, items 822, users 814, carts 816, and so forth. For example, a series of images acquired by the cameras 702 may indicate removal by the user 814 of an item 822 from a particular accessory or other location at the inventory location 812 and placement of the item 822 on or at least partially within the cart 816.

The facility 802 may be configured to receive different kinds of items 822 from various suppliers and to store them until a customer orders or retrieves one or more of the items 822. As illustrated in this example, items 822 may be received from one or more suppliers, such as manufacturers, distributors, wholesalers, and so forth, at the receiving area 804. In various implementations, the items 822 may include merchandise, commodities, perishables, or any suitable type of item 822, depending on the nature of the enterprise that operates the facility 802.

Upon being received from a supplier at the receiving area 804, the items 822 may be prepared for storage in the storage area 806. For example, in some implementations, items 822 may be unpacked or otherwise rearranged. The inventory management system 820 may include one or more software applications executing on a computer system to provide inventory management functions. These inventory management functions may include maintaining information indicative of the type, quantity, condition, cost, location, weight, or any other suitable parameters with respect to the items 822. The items 822 may be stocked, managed, or dispensed in terms of countable units, individual units, or multiple units, such as packages, cartons, crates, pallets, or other suitable aggregations. Alternatively, some items 822, such as bulk products, commodities, and so forth, may be stored in continuous or arbitrarily divisible amounts that may not be inherently organized into countable units. Such items 822 may be managed in terms of a measurable quantity such as units of length, area, volume, weight, time, duration, or other dimensional properties characterized by units of measurement. Generally speaking, a quantity of an item 822 may refer to either a countable number of individual or aggregate units of an item 822 or a measurable amount of an item 822, as appropriate.

After arriving through the receiving area 804, items 822 may be stored within the storage area 806. In some implementations, like items 822 may be stored or displayed together in the inventory locations 812 such as in bins, on shelves, hanging from pegboards, and so forth. In this implementation, all items 822 of a given kind are stored in one inventory location 812. In other implementations, like items 822 may be stored in different inventory locations 812. For example, to optimize retrieval of certain items 822 having frequent turnover within a large physical facility 802, those items 822 may be stored in several different inventory locations 812 to reduce congestion that might occur at a single inventory location 812.

When a customer order specifying one or more items 822 is received, or as a user 814 progresses through the facility 802, the corresponding items 822 may be selected or "picked" from the inventory locations 812 containing those items 822. In various implementations, item picking may range from manual to completely automated picking. For example, in one implementation, a user 814 may have a list of items 822 they desire and may progress through the facility 802 picking items 822 from inventory locations 812 within the storage area 806 and placing those items 822 into a cart 816. In other implementations, employees of the facility 802 may pick items 822 using written or electronic pick lists derived from customer orders. These picked items 822 may be placed into the cart 816 as the employee progresses through the facility 802.

After items 822 have been picked, the items 822 may be processed at a transition area 808. The transition area 808 may be any designated area within the facility 802 where items 822 are transitioned from one location to another or from one entity to another. For example, the transition area 808 may be a packing station within the facility 802. When the item 822 arrives at the transition area 808, the item 822 may be transitioned from the storage area 806 to the packing station. Information about the transition may be maintained by the inventory management system 820.

In another example, if the items 822 are departing the facility 802, a list of the items 822 may be obtained and used by the inventory management system 820 to transition responsibility for, or custody of, the items 822 from the facility 802 to another entity. For example, a carrier may accept the items 822 for transport with that carrier accepting responsibility for the items 822 indicated in the list. In another example, a user 814 may purchase or rent the items 822 and remove the items 822 from the facility 802. During use of the facility 802, the user 814 may move about the facility 802 to perform various tasks, such as picking or placing the items 822 in the inventory locations 812.

To facilitate operation of the facility 802, the inventory management system 820 is configured to use the sensor data 1026, such as data from weight sensors 108, image data, and other information such as item data 1032, physical layout data 1034, and so forth, to generate interaction data 1038.

The interaction data 1038 may provide information about an interaction, such as a pick of an item 822 from the inventory location 812, a place of an item 822 to the inventory location 812, a touch made to an item 822 at the inventory location 812, a gesture associated with an item 822 at the inventory location 812, and so forth. The interaction data 1038 may include one or more of the type of interaction, interaction location identifier indicative of where from the inventory location 812 the interaction took place, item identifier, quantity change to the item 822, user identifier, and so forth. The interaction data 1038 may then be used to further update the item data 1032. For example, the quantity of items 822 on hand at a particular accessory may be changed based on an interaction that picks or places one or more items 822.

The inventory management system 820 may perform other operations, determining inventory to restock, determining user billing data, and so forth.

Figure 9:
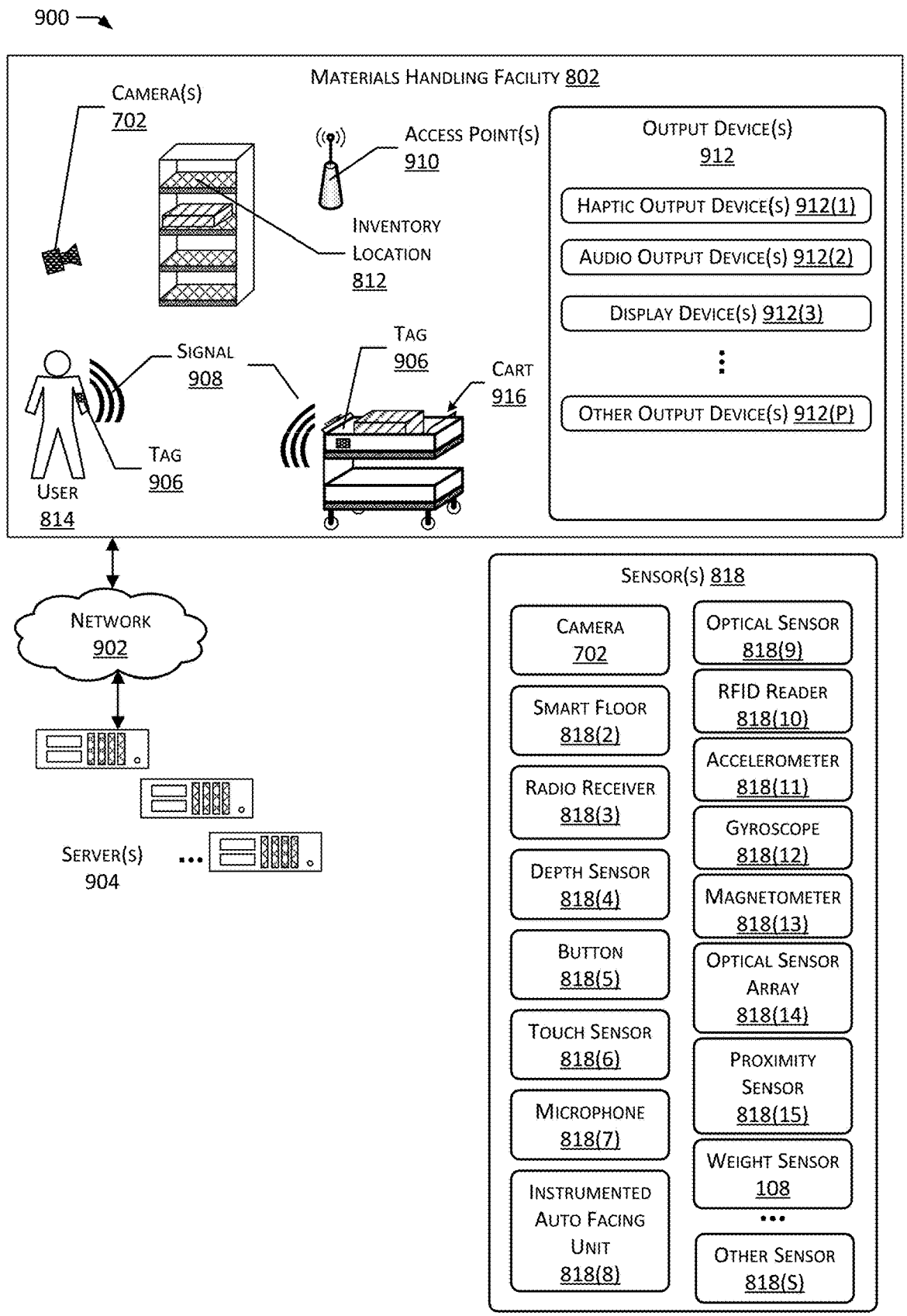
FIG. 9 is a block diagram illustrating additional details of the facility, according to some implementations.

FIG. 9 is a block diagram 900 illustrating additional details of the facility 802, according to some implementations. The facility 802 may be connected to one or more networks 902, which in turn connect to one or more computing devices, such as servers 904. The network 902 may include private networks such as an institutional or personal intranet, public networks such as the Internet, or a combination thereof. The network 902 may utilize wired technologies (e.g., wires, fiber optic cables, and so forth), wireless technologies (e.g., radio frequency, infrared, acoustic, optical, and so forth), or other connection technologies. The network 902 is representative of any type of communication network, including one or more of data networks or voice networks. The network 902 may be implemented using wired infrastructure (e.g., copper cable, fiber optic cable, and so forth), a wireless infrastructure (e.g., cellular, microwave, satellite, and so forth), or other connection technologies.

The servers 904 may be configured to execute one or more modules or software applications associated with the inventory management system 820 or other systems. While the servers 904 are illustrated as being in a location outside of the facility 802, in other implementations, at least a portion of the servers 904 may be located at the facility 802.

The users 814, the carts 816, items 822, or other objects in the facility 802 may be equipped with one or more tags 906. The tags 906 may be configured to emit a signal 1208. In one implementation, the tag 906 may be a radio frequency identification (RFID) tag 906 configured to emit a RF signal 1208 upon activation by an external signal. For example, the external signal may comprise a radio frequency signal or a magnetic field configured to energize or activate the RFID tag 906. In another implementation, the tag 906 may comprise a transmitter and a power source configured to power the transmitter. For example, the tag 906 may comprise a Bluetooth Low Energy (BLE) transmitter and battery. In other implementations, the tag 906 may use other techniques to indicate presence of the tag 906. For example, an acoustic tag 906 may be configured to generate an ultrasonic signal 1208, which is detected by corresponding acoustic receivers. In yet another implementation, the tag 906 may be configured to emit an optical signal 1208.

The inventory management system 820 may be configured to use the tags 906 for one or more of identification of the object, determining a location of the object, and so forth. For example, the user 814 may wear tags 906, the carts 816 may have tags 906 affixed, items 822 may have tags 906 affixed to their packaging, and so forth, which may be read and, based at least in part on signal strength, used to determine one or more of identity or location.

Generally, the inventory management system 820 or other systems associated with the facility 802 may include any number and combination of input components, output components, and servers 904.

The one or more sensors 818 may be arranged at one or more locations within the facility 802. For example, the sensors 818 may be mounted on or within a floor, wall, at a ceiling, at an inventory location 812, on a cart 816, may be carried or worn by a user 814, and so forth.

The sensors 818 may include one or more cameras 702 or other imaging sensors. The one or more cameras 702 may include imaging sensors configured to acquire images of a scene. The cameras 702 are configured to detect light in one or more wavelengths including, but not limited to, terahertz, infrared, visible, ultraviolet, and so forth. The cameras 702 may comprise charge coupled devices (CCD), complementary metal oxide semiconductor (CMOS) devices, microbolometers, and so forth. The inventory management system 820 may use image data acquired by the cameras 702 during operation of the facility 802. For example, the inventory management system 820 may identify items 822, users 814, carts 816, and so forth, based at least in part on their appearance within the image data acquired by the cameras 702. The cameras 702 may be mounted in various locations within the facility 802. For example, cameras 702 may be mounted overhead, on inventory locations 812, may be worn or carried by the user 814, may be affixed to carts 816, and so forth.

The sensors 818 may include a smart floor 818(2). The smart floor 818(2) is able to provide information about the location of objects, such as a user 814, carts 816, and so forth. This information may include identifying the object, determining a location of the object, tracking the object, and so forth. The smart floor 818(2) may utilize smart floor devices that comprise one or more of transmitters or receivers that radiate or receive electromagnetic signals from antennas located at or underneath the floor. Based on information about what antenna radiated a signal and what antenna acquired the signal, information about an object on or above the floor may be determined. For example, the smart floor 818(2) may comprise sensing elements, or segments. Each segment may include an antenna that is coupled to one or more of a transmitter or a receiver. During operation, the segment may transmit an electromagnetic signal 1208 that is radiated by the antenna, receive an electromagnetic signal that is acquired by the antenna, or both. In some implementations the smart floor 818(2) may operate as a physically large touch sensor that is deployed at floor level. The electromagnetic signals 1208 provide information about the presence of an object thereon. For example, the segments may electromagnetically couple to objects that are close by, allowing for the detection of objects that are either in contact with the floor or above the floor. In some implementations, instead of or in addition to the visual tracking of the object, the smart floor 818(2) may be used to provide object representation movement data. For example, the output from the segments obtained during a particular window of time may be processed in a fashion similar to the image data.

One or more radio receivers 818(3) may also be included as sensors 818. In some implementations, the radio receivers 818(3) may be part of transceiver assemblies. The radio receivers 818(3) may be configured to acquire RF signals 1208 associated with RFID, Wi-Fi, Bluetooth, ZigBee, 4G, LTE, or other wireless data transmission technologies. The radio receivers 818(3) may provide information associated with data transmitted via radio frequencies, signal strength of RF signals 1208, and so forth. For example, information from the radio receivers 818(3) may be used by the inventory management system 820 to determine a location of an RF source, such as a transmitter carried by the user 814, a transmitter on the cart 816, a tag 906 on the item 822, and so forth.

One or more depth sensors 818(4) may also be included in the sensors 818. The depth sensors 818(4) are configured to acquire spatial or three-dimensional (3D) data, such as depth information, about objects within a field-of-view (FOV). The depth sensors 818(4) may include range cameras, lidar systems, sonar systems, radar systems, structured light systems, stereo vision systems, optical interferometry systems, and so forth. The inventory management system 820 may use the 3D data acquired by the depth sensors 818(4) to identify objects, determine a location of an object in 3D real space, identify a user 814, and so forth.

One or more buttons 818(5) may be configured to accept input from the user 814. The buttons 818(5) may comprise mechanical, capacitive, optical, or other mechanisms. For example, the buttons 818(5) may comprise mechanical switches configured to accept an applied force from a touch of the user 814 to generate an input signal. The inventory management system 820 may use data from the buttons 818(5) to receive information from the user 814. For example, the cart 816 may be configured with a button

818(5) to accept input from the user 814 and send information indicative of the input to the inventory management system 820.

The sensors 818 may include one or more touch sensors 818(6). The touch sensors 818(6) may use resistive, capacitive, surface capacitance, projected capacitance, mutual capacitance, optical, Interpolating Force-Sensitive Resistance (IFSR), or other mechanisms to determine the position of a touch or near-touch. For example, the IFSR may comprise a material configured to change electrical resistance responsive to an applied force. The location within the material of that change in electrical resistance may indicate the position of the touch. The inventory management system 820 may use data from the touch sensors 818(6) to receive information from the user 814. For example, the touch sensor 818(6) may be integrated with the cart 816 to provide a touchscreen with which the user 814 may select, from a menu, one or more particular items 822 for picking, enter a manual count of items 822 at an inventory location 812, and so forth.

One or more microphones 818(7) may be configured to acquire information indicative of sound present in the environment. In some implementations, arrays of microphones 818(7) may be used. These arrays may implement beamforming techniques to provide for directionality of gain. The inventory management system 820 may use the one or more microphones 818(7) to acquire information from acoustic tags 906, accept voice input from the user 814, determine ambient noise level, and so forth.

The sensors 818 may include instrumented auto facing units (IAFUs) 818(8). The IAFU 818(8) may comprise a position sensor configured to provide data indicative of displacement of a pusher. As an item 822 is removed from the IAFU 818(8), the pusher moves, such as under the influence of a spring, and pushes the remaining items 822 in the IAFU 818(8) to the front of the inventory location 812. By using data from the position sensor, and given item data 1032 such as a depth of an individual item 822, a count may be determined, based on a change in position data. For example, if each item 822 is 1 inch deep, and the position data indicates a change of 10 inches, the quantity held by the IAFU 818(8) may have changed by 10 items 822. This count information may be used to confirm or provide a cross check for a count obtained by other means, such as analysis of the sensor data from the weight sensors 108.

The sensors 818 may include one or more optical sensors 818(9). The optical sensors 818(9) may be configured to provide data indicative of one or more of color or intensity of light impinging thereupon. For example, the optical sensor 818(9) may comprise a photodiode and associated circuitry configured to generate a signal 1208 or data indicative of an incident flux of photons. As described below, the optical sensor array 818(14) may comprise a plurality of the optical sensors 818(9). The optical sensors 818(9) may include photodiodes, photoresistors, photovoltaic cells, quantum dot photoconductors, bolometers, pyroelectric infrared detectors, and so forth. For example, the optical sensor 818(9) may use germanium photodiodes to detect infrared light.

One or more radio frequency identification (RFID) readers 818(10), near field communication (NFC) systems, and so forth, may be included as sensors 818. For example, the RFID readers 818(10) may be configured to read the RF tags 906. Information acquired by the RFID reader 818(10) may be used by the inventory management system 820 to identify an object associated with the RF tag 906 such as the item 822, the user 814, the cart 816, and so forth. For example, based on information from the RFID readers 818(10) detecting the RF tag 906 at a particular inventory location, an item 822 being placed or picked may be determined.

The sensors 818 may include one or more accelerometers 818(11), which may be worn or carried by the user 814, mounted to the cart 816, and so forth. The accelerometers 818(11) may provide information such as the direction and magnitude of an imposed acceleration. Data such as rate of acceleration, determination of changes in direction, speed, and so forth, may be determined using the accelerometers 818(11).

A gyroscope 818(12) may provide information indicative of rotation of an object affixed thereto. For example, the cart 816 or other objects may be equipped with a gyroscope 818(12) to provide data indicative of a change in orientation of the object.

A magnetometer 818(13) may be used to determine an orientation by measuring ambient magnetic fields, such as the terrestrial magnetic field. The magnetometer 818(13) may be worn or carried by the user 814, mounted to the cart 816, and so forth. For example, the magnetometer 818(13) mounted to the cart 816 may act as a compass and provide information indicative of which direction the cart 816 is oriented.

An optical sensor array 818(14) may comprise one or optical sensors 818(9). The optical sensors 818(9) may be arranged in a regular, repeating, or periodic two-dimensional arrangement such as a grid. The optical sensor array 818(14) may generate image data. For example, the optical sensor array 818(14) may be arranged within or below an inventory location 812 and obtain information about shadows of items 822, hand of the user 814, and so forth.

The sensors 818 may include proximity sensors 818(15) used to determine presence of an object, such as the user 814, the cart 816, and so forth. The proximity sensors 818(15) may use optical, electrical, ultrasonic, electromagnetic, or other techniques to determine a presence of an object. In some implementations, the proximity sensors 818(15) may use an optical emitter and an optical detector to determine proximity. For example, an optical emitter may emit light, a portion of which may then be reflected by the object back to the optical detector to provide an indication that the object is proximate to the proximity sensor 818(15). In other implementations, the proximity sensors 818(15) may comprise a capacitive proximity sensor 818(15) configured to provide an electrical field and determine a change in electrical capacitance due to presence or absence of an object within the electrical field.

The proximity sensors 818(15) may be configured to provide sensor data 1026 indicative of one or more of a presence or absence of an object, a distance to the object, or characteristics of the object. An optical proximity sensor 818(15) may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. In another implementation, a structured light pattern may be provided by the optical emitter. A portion of the structured light pattern may then be detected on the object using a sensor 818 such as a camera 702. Based on an apparent distance between the features of the structured light pattern, the distance to the object may be calculated. Other techniques may also be used to determine distance to the object. In another example, the color of the reflected light may be used to characterize the object, such as skin, clothing, cart 816, and so forth.

The one or more weight sensors 108 are configured to measure the weight of a load, such as the item 822, the cart 816, or other objects. The weight sensors 108 may be configured to measure the weight of the load at one or more of the inventory locations 812, the cart 816, on the floor of the facility 802, and so forth. For example, a fixture of the inventory location 812 may include a plurality of weight sensors 108. The weight sensors 108 may include one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms of weight sensors 108 may operate as transducers that generate one or more signals based on an applied force, such as that of the load due to gravity. For example, the weight sensor 108 may comprise a load cell having a strain gauge and a structural member that deforms slightly when weight is applied. By measuring a change in the electrical characteristic of the strain gauge, such as capacitance or resistance, the weight may be determined. In another example, the weight sensor 108 may comprise a piezoelectric material affixed to a portion of the apparatus 100. As a load on the portion of the apparatus 100 changes, the piezoelectric material may produce an output signal. This output signal may be processed to determine a change in weight. In another example, the weight sensor 108 may comprise a force sensing resistor (FSR). The FSR may comprise a resilient material that changes one or more electrical characteristics when compressed. For example, the electrical resistance of a particular portion of the FSR may decrease as the particular portion is compressed. The inventory management system 820 may use the data acquired by the weight sensors 108 to identify an object, determine a change in the quantity of objects, determine a location of an object, maintain shipping records, and so forth.

The sensors 818 may include other sensors 818(S) as well. For example, the other sensors 818(S) may include light curtains, ultrasonic rangefinders, thermometers, barometric sensors, hygrometers, and so forth.

In some implementations, the sensors 818 may include hardware processors, memory, and other elements configured to perform various functions. For example, the cameras 702 may be configured to generate image data, send the image data to another device such as the server 904, and so forth.

The facility 802 may include one or more access points 910 configured to establish one or more wireless networks. The access points 910 may use Wi-Fi, NFC, Bluetooth, or other technologies to establish wireless communications between a device and the network 902. The wireless networks allow the devices to communicate with one or more of the sensors 818, the inventory management system 820, the tag 906, a communication device of the cart 816, or other devices.

Output devices 912 may also be provided in the facility 802. The output devices 912 are configured to generate signals 1208, which may be perceived by the user 814 or detected by the sensors 818. In some implementations, the output devices 912 may be used to provide illumination of the optical sensor array 818(14).

Haptic output devices 912(1) are configured to provide a signal 1208 that results in a tactile sensation to the user 814. The haptic output devices 912(1) may use one or more mechanisms such as electrical stimulation or mechanical displacement to provide the signal 1208. For example, the haptic output devices 912(1) may be configured to generate a modulated electrical signal, which produces an apparent tactile sensation in one or more fingers of the user 814. In another example, the haptic output devices 912(1) may comprise piezoelectric or rotary motor devices configured to provide a vibration, which may be felt by the user 814.

One or more audio output devices 912(2) may be configured to provide acoustic output. The acoustic output includes one or more of infrasonic sound, audible sound, or ultrasonic sound. The audio output devices 912(2) may use one or more mechanisms to generate the acoustic output. These mechanisms may include, but are not limited to, the following: voice coils, piezoelectric elements, magnetostrictive elements, electrostatic elements, and so forth. For example, a piezoelectric buzzer or a speaker may be used to provide acoustic output.

The display devices 912(3) may be configured to provide output, which may be seen by the user 814 or detected by a light-sensitive sensor such as a camera 702 or an optical sensor 818(9). In some implementations, the display devices 912(3) may be configured to produce output in one or more of infrared, visible, or ultraviolet light. The output may be monochrome or in color. The display devices 912(3) may be one or more of emissive, reflective, microelectromechanical, and so forth. An emissive display device 912(3), such as using LEDs, is configured to emit light during operation. In comparison, a reflective display device 912(3), such as using an electrophoretic element, relies on ambient light to present an image. Backlights or front lights may be used to illuminate non-emissive display devices 912(3) to provide visibility of the output in conditions where the ambient light levels are low.

The display devices 912(3) may be located at various points within the facility 802. For example, the addressable displays may be located on inventory locations 812, carts 816, on the floor of the facility 802, and so forth.

Other output devices 912(P) may also be present. For example, the other output devices 912(P) may include scent/odor dispensers, document printers, 3D printers or fabrication equipment, and so forth.

Figure 10:
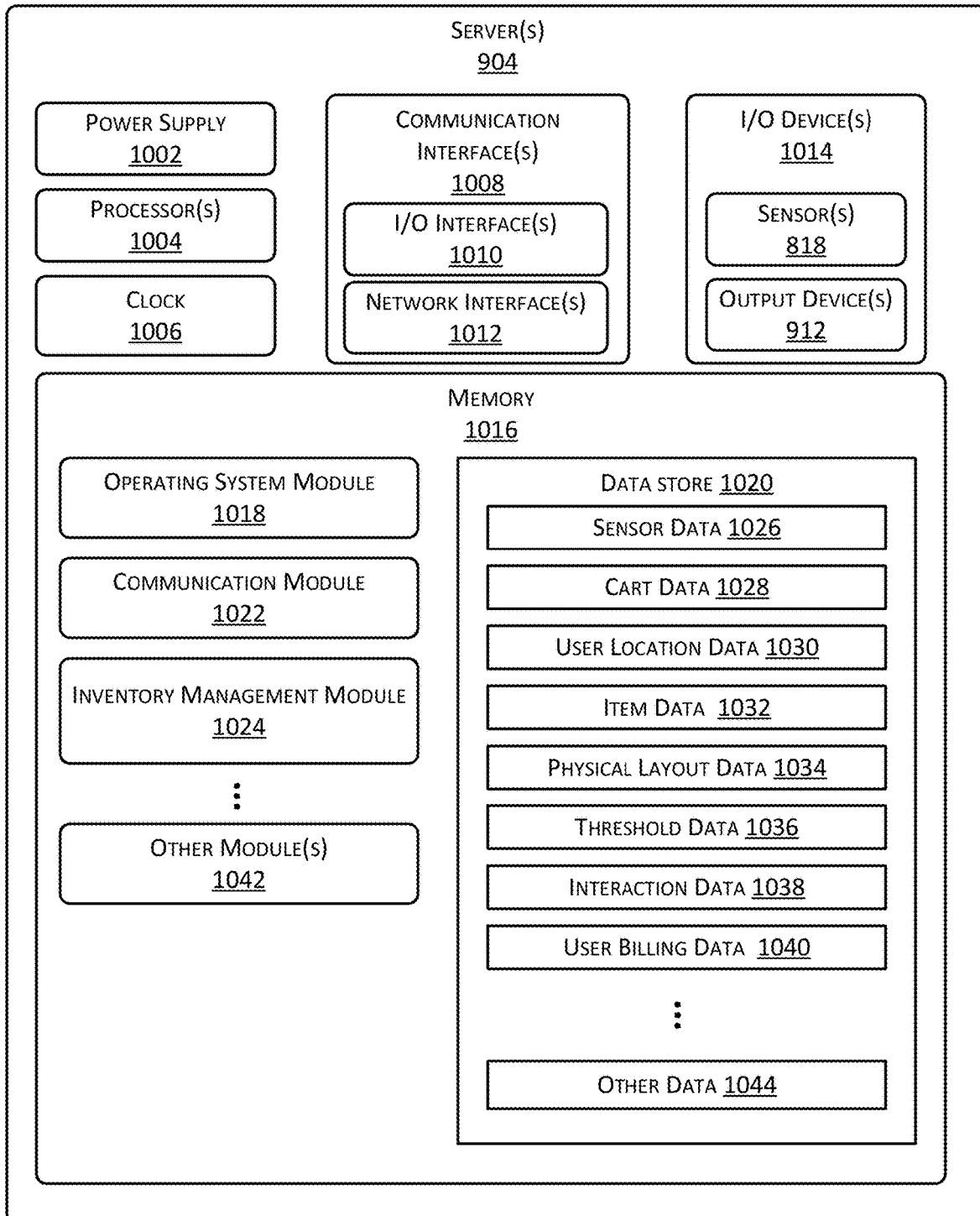
FIG. 10 is a block diagram of a server to support operation of the facility, according to some implementations.

FIG. 10 illustrates a block diagram 1000 of a server 904 configured to support operation of the facility 802, according to some implementations. The server 904 may be physically present at the facility 802, may be accessible by the network 902, or a combination of both. The server 904 does not require end-user knowledge of the physical location and configuration of the system that delivers the services. Common expressions associated with the server 904 may include "on-demand computing", "software as a service (SaaS)", "platform computing", "network-accessible platform", "cloud services", "data centers", and so forth. Services provided by the server 904 may be distributed across one or more physical or virtual devices.

One or more power supplies 1002 may be configured to provide electrical power suitable for operating the components in the server 904. The one or more power supplies 1002 may comprise batteries, capacitors, fuel cells, photovoltaic cells, wireless power receivers, conductive couplings suitable for attachment to an external power source such as provided by an electric utility, and so forth. The server 904 may include one or more hardware processors 1004 (processors) configured to execute one or more stored instructions. The processors 1004 may comprise one or more cores. One or more clocks 1006 may provide information indicative of date, time, ticks, and so forth. For example, the processor 1004 may use data from the clock 1006 to associate a particular interaction with a particular point in time.

The server 904 may include one or more communication interfaces 1008 such as input/output (I/O) interfaces 1010, network interfaces 1012, and so forth. The communication interfaces 1008 enable the server 904, or components thereof, to communicate with other devices or components. The communication interfaces 1008 may include one or more I/O interfaces 1010. The I/O interfaces 1010 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 1010 may couple to one or more I/O devices 1014. The I/O devices 1014 may include input devices such as one or more of a sensor 818, keyboard, mouse, scanner, and so forth. The I/O devices 1014 may also include output devices 912 such as one or more of a display device 912(3), printer, audio speakers, and so forth. In some embodiments, the I/O devices 1014 may be physically incorporated with the server 904 or may be externally placed.

The network interfaces 1012 may be configured to provide communications between the server 904 and other devices, such as the carts 816, routers, access points 910, and so forth. The network interfaces 1012 may include devices configured to couple to personal area networks (PANS), local area networks (LANs), wireless local area networks (WLANS), wide area networks (WANs), and so forth. For example, the network interfaces 1012 may include devices compatible with Ethernet, Wi-Fi, Bluetooth, ZigBee, and so forth.

The server 904 may also include one or more busses or other internal communications hardware or software that allow for the transfer of data between the various modules and components of the server 904.

The server 904 includes one or more memories 1016. The memory 1016 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 1016 provides storage of computer-readable instructions, data structures, program modules, and other data for the operation of the server 904. A few example functional modules are shown stored in the memory 1016, although the same functionality may alternatively be implemented in hardware, firmware, or as a system on a chip (SoC).

The memory 1016 may include at least one operating system (OS) module 1018. The OS module 1018 is configured to manage hardware resource devices such as the I/O interfaces 1010, the I/O devices 1014, the communication interfaces 1008, and provide various services to applications or modules executing on the processors 1004. The OS module 1018 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Washington, USA; and so forth.

Also stored in the memory 1016 may be a data store 1020 and one or more of the following modules. These modules may be executed as foreground applications, background tasks, daemons, and so forth. The data store 1020 may use a flat file, database, linked list, tree, executable code, script, or other data structure to store information. In some implementations, the data store 1020 or a portion of the data store 1020 may be distributed across one or more other devices including the servers 904, network attached storage devices, and so forth.

A communication module 1022 may be configured to establish communications with one or more of the carts 816, sensors 818, display devices 912(3), other servers 904, or other devices. The communications may be authenticated, encrypted, and so forth.

The memory 1016 may store an inventory management module 1024. The inventory management module 1024 is configured to provide the inventory functions as described herein with regard to the inventory management system 820. For example, the inventory management module 1024 may track items 822 between different inventory locations 812, to and from the carts 816, generate restocking orders, direct operation of robots within the facility 802, and so forth. The inventory management module 1024 may access sensor data 1026 such as one or more of weight data from the weight sensors 108, image data, received data, and so forth.

Information used by the inventory management module 1024 may be stored in the data store 1020. For example, the data store 1020 may be used to store the sensor data 1026, cart data 1028, user location data 1330, item data 1032, physical layout data 1034, threshold data 1036, interaction data 1038, user billing data 1040, and so forth.

The cart data 1028 comprises information about the items 822 that are determined to be in the custody of the user 814. For example, the cart data 1028 may indicate the items 822 that are within the cart 816 that is associated with the account of the user 814, currently being carried by the user 814, and so forth. The cart data 1028 may be based at least in part on the interaction data 1038. For example, the interaction data 1038 may be associated with a particular user 814, changing the contents of the cart data 1028 based on the interaction.

The inventory management module 1024 may generate the user location data 1330 that is indicative of the location of the user 814 within the facility 802. For example, the inventory management module 1024 may use image data obtained by the cameras 702 to determine a location of the user 814. In other implementations, other techniques may be used for determining the user location data 1330. For example, data from the smart floor 818(2) may be used to determine the location of the user 814. Based on the user location data 1330 and the interaction data 1038, a particular interaction may be associated with an account of a particular user 814. For example, if the user location data 1330 indicates that the user 814 is present in front of inventory location 812(492) at time 17:47:20 and the interaction data 1038 indicates a pick of a quantity of one item 822(D) from bracket 128(7) on apparatus 100(1) of inventory location 812(492) at 17:47:27, the user 814 may be billed for that pick.

The threshold data 1036 comprises the various thresholds used by the system. For example, the threshold data 1036 may specify values for confidence thresholds that are used to determine if a hypothesis is deemed suitable to be used to generate the interaction data 1038.

The inventory management module 1024 may generate user billing data 1040 based on the cart data 1028. For example, when a user 814 leaves the facility 802, the items in the cart data 1028 and their respective quantities may be used to generate user billing data 1040. In some implementations, the user billing data 1040 may be used to bill a payment account associated with the user 814.

The inventory management module 1024 may utilize the physical layout data 1034 during operation. The physical layout data 1034 may provide information indicative of where cameras 702, weight sensors 108, antennas for the radio receivers 818(3), inventory locations 812, and so forth are in the facility 802 with respect to one another. For example, the physical layout data 1034 may comprise information representative of a map or floor plan of the facility 802 with relative positions of inventory locations 812 and cameras 702.

The inventory management module 1024 may process the sensor data 1026 and generate output data. For example, based on the interaction data 1038, a quantity of a type of item 822 at a particular inventory location 812 may drop below a threshold restocking level. The system may generate output data comprising a restocking order indicative of the inventory location 812 and a quantity needed to replenish stock to a predetermined level. The restocking order may then be used to direct a robot to restock that inventory location 812.

Other modules 1042 may also be present in the memory 1016 as well as other data 1044 in the data store 1020.

The implementations described above are provided for illustration, and not necessarily as limitations. For example, the fixtures may support different numbers of accessories, combinations of different accessories on the same fixture, and so forth.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques and devices described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

The invention claimed is:

1. An apparatus comprising:
a crossbar having a first axis extending from a first end to a second end, wherein the crossbar comprises a plurality of accessory interfaces that include a plurality of pegboard holes;
a first bracket comprising:
a first portion comprising a first structure associated with support of the crossbar, and
a second portion that, with respect to the first portion, is moveable along a direction that is parallel to the first axis; and
a tether device comprising:
a first feature that engages a portion of one of a saddle mount accessory or a hook of a horizontal slot accessory, and
at least one arm extending from the first feature, wherein the at least one arm comprises an engagement feature that engages with one of the plurality of pegboard holes.

2. The apparatus of claim 1, wherein:
the plurality of accessory interfaces further include a saddle mount and a horizontal slot.

3. The apparatus of claim 1, further comprising:
a first weight sensor comprising:
a third end that is attached to the first end of the crossbar, and
a fourth end that is attached to the first structure of the first portion of the first bracket.

4. The apparatus of claim 1, the first bracket further comprising:
a third portion comprising:
a second feature that engages with a third feature on the first portion of the first bracket; and
a fourth feature that engages with a fifth feature on the second portion of the first bracket;
wherein the second feature and the fourth feature are configured to constrain movement of the second portion relative to the first portion.

5. The apparatus of claim 1, further comprising:
a second bracket comprising a third portion, wherein the third portion comprises a third end that attaches to one or more support structures;
wherein the first bracket comprises a fourth end that attaches to the one or more support structures; and wherein movement of the second portion relative to the first portion is associated with a plurality of attachment locations of the one or more support structures.

6. The apparatus of claim 1, further comprising:
a weight sensor comprising:
   a third end that attaches to the first end of the crossbar, and
   a fourth end that attaches to the second end of the crossbar; and
a second bracket comprises one of: an extensible bracket or a fixed bracket, wherein:
   the extensible bracket comprises:
      a third portion attached to the third end of the weight sensor, and
      a fourth portion that, with respect to the third portion, is moveable in a direction that is parallel to the first axis; and
   the fixed bracket comprises:
      a fifth portion comprising: a fifth end that attaches to the third end of the weight sensor and a sixth end that attaches to one or more support structures.

7. The apparatus of claim 1, further comprising one or more of:
a first weight sensor comprising:
   a third end that is attached to the first end of the crossbar, and
   a fourth end that is attached to the first structure of the first portion of the first bracket; or
a second weight sensor comprising:
   a fifth end that is attached to a mounting feature of the crossbar, and
   a sixth end supporting an accessory to stow one or more items.

8. A system comprising:
an apparatus comprising:
   a crossbar comprising a first axis extending from a first end to a second end;
   a first bracket comprising:
      a first portion comprising a first structure associated with support of the crossbar, and
      a second portion that, with respect to the first portion, is moveable along a direction that is parallel to the first axis; and
   a tether device comprising:
      a first feature that engages a portion of a first accessory, and
      two arms extending from the first feature in opposite directions, wherein each arm comprises an engagement feature that engages with the crossbar.

9. The system of claim 8, further comprising:
a first weight sensor comprising:
   a third end that is attached to the first end of the crossbar, and
   a fourth end that is attached to the first structure of the first portion of the first bracket.

10. The system of claim 8, further comprising:
a weight sensor comprising:
   a third end that attaches to the first end of the crossbar, and
   a fourth end that attaches to the second end of the crossbar; and
a second bracket comprising one of: an extensible bracket or a fixed bracket, wherein:
   the extensible bracket comprises:
      a third portion attached to the third end of the weight sensor, and
      a fourth portion that, with respect to the third portion, is moveable in a direction that is parallel to the first axis; and
   the fixed bracket comprises:
      a fifth portion comprising: a fifth end that attaches to the third end of the weight sensor and a sixth end that attaches to one or more support structures.

11. The system of claim 8, wherein:
the first portion of the first bracket further comprises a first protrusion,
the second portion of the first bracket comprises a first hole, and
the first bracket further comprises a third portion comprising a second protrusion and a second hole, wherein:
   the third portion is configured to be constrained in movement by an area around the first protrusion within the second hole, and
   the second portion is configured to be constrained in movement by engagement of the second protrusion within the first hole.

12. The system of claim 8, wherein:
the crossbar further comprises a plurality of accessory interfaces, including a saddle mount, a horizontal slot, and a plurality of pegboard holes,
the first accessory comprises a saddle mount accessory or a hook of a horizontal slot accessory, and
the engagement feature that engages with the crossbar is configured to engage with a pegboard hole of the plurality of pegboard holes.

13. The system of claim 8, further comprising:
the first accessory comprising:
   a first portion comprising a second feature; and
   a second portion comprising:
      a first side comprising a first one or more ridges, and
      a second side comprising a second one or more ridges;
wherein the first and second one or more ridges comprise plastic that is configured to deform in response to a force applied to the second feature; and
wherein the first accessory, in response to the force applied to the second feature, is configured to engage with the first bracket and a horizontal slot of a slatwall.

14. The system of claim 8, the apparatus further comprising:
one or more sensors to generate sensor data; and
a communication interface to send the sensor data to an external device.

15. An apparatus comprising:
a crossbar comprising a first axis extending from a left end to a right end;
a first bracket comprising:
   a first portion comprising a first structure associated with support of the crossbar, and
   a second portion that, with respect to the first portion, is moveable along a first direction that is parallel to the first axis;
a second bracket comprising:
   a third portion, and
   a fourth portion that, with respect to the third portion, is moveable in a second direction that is parallel to the first axis; and
a tether device configured to engage with an accessory and the crossbar, wherein:
   the first portion of the first bracket comprises a first protrusion,
   the second portion of the first bracket comprises a first hole, and the first bracket further comprises a fifth portion comprising a second protrusion and a second hole, further wherein:

the fifth portion is configured to be constrained in movement by an area around the first protrusion within the second hole, and the second portion is configured to be constrained in movement by engagement of the second protrusion within the first hole.

16. The apparatus of claim 15, further comprising:

a first weight sensor comprising:

a first end that is attached to the left end of the crossbar, and a second end that is attached to the first structure of the first portion of the first bracket; and a second weight sensor comprising:

a third end that attaches to the right end of the crossbar, and a fourth end that is attached to the second bracket.

17. The apparatus of claim 15, wherein:

the crossbar comprises a plurality of accessory interfaces, including a saddle mount, a horizontal slot, and a plurality of pegboard holes, the accessory comprises a saddle mount accessory or a horizontal slot accessory, the tether device comprises a first feature that engages a portion of the accessory, the tether device further comprises at least one arm extending from the first feature, and the at least one arm comprises an engagement feature configured to engage with a pegboard hole of the plurality of pegboard holes on the crossbar.

18. The apparatus of claim 15, further comprising:

a weight sensor comprising:

a first end that attaches to the left end of the crossbar, and a second end that attaches to the right end of the crossbar;

wherein the second bracket further comprises one of an extensible bracket or a fixed bracket.

\* \* \* \* \*